(12) United States Patent
Kazmi et al.

(10) Patent No.: US 12,056,099 B2
(45) Date of Patent: *Aug. 6, 2024

(54) USER GENERATED TAG COLLECTION SYSTEM AND METHOD

(71) Applicant: HARTFORD FIRE INSURANCE COMPANY, Hartford, CT (US)

(72) Inventors: Saira A. Kazmi, Glastonbury, CT (US); Arthur Paul Drennan, III, Avon, CT (US); Steven J Cultrera, Newington, CT (US); Vasanth Madhavan Srinivasaraghavan, South Windsor, CT (US); Justin G. Plock, Southport, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,011

(22) Filed: Apr. 27, 2023

(65) Prior Publication Data

US 2023/0259499 A1 Aug. 17, 2023

Related U.S. Application Data

(63) Continuation of application No. 16/809,121, filed on Mar. 4, 2020, now Pat. No. 11,675,750.

(51) Int. Cl.
*G06F 16/21* (2019.01)
*G06F 16/23* (2019.01)
*G06F 16/93* (2019.01)
*G06N 5/04* (2023.01)
*G06N 20/00* (2019.01)
*G06Q 10/105* (2023.01)
*G06Q 40/08* (2012.01)

(52) U.S. Cl.
CPC ........ *G06F 16/211* (2019.01); *G06F 16/2379* (2019.01); *G06F 16/93* (2019.01); *G06N 5/04* (2013.01); *G06N 20/00* (2019.01); *G06Q 10/105* (2013.01); *G06Q 40/08* (2013.01)

(58) Field of Classification Search
CPC ..... G06F 16/93; G06F 16/2379; G06F 16/211
See application file for complete search history.

*Primary Examiner* — Hau H Hoang
(74) *Attorney, Agent, or Firm* — Buckley, Maschoff & Talwalkar LLC

(57) ABSTRACT

In some embodiments, an input document is received at a tagging platform, via a communication device, and associates it with a tag request. The tagging platform automatically selects at least one electronic record associated with a first user from a user data store containing electronic records associated with users (each record including at least a user identifier and a user communication address). The input document and tag request are transmitted to the communication address associated with the first user, and a document tag is received from the first user. The tagging platform may then store the document tag in a document mining result database by adding an entry to the database identifying the received document tag and transmit an indication associated with the document mining result database to a plurality of risk applications.

19 Claims, 25 Drawing Sheets

| DOCUMENT TAGGING RESULT IDENTIFIER 1802 | LOSS DESCRIPTION 1804 | DATE 1806 | USER IDENTIFIER 1808 | CLAIM IDENTIFIER 1810 |
|---|---|---|---|---|
| DTR_10001 | HURRICANE | 7/18/2020 | U_100001 | C_438181823 |
| DTR_10002 | FRONT FENDER | 4/21/2024 | U_100010 | C_8782378 |
| DTR_10003 | ACCIDENT | 11/30/20218 | U_1000183 | C_13481833 |
| DTR_10004 | SLIP AND FALL | 1/14/2026 | U_100010 | C_23721878 |
| DTR_100018 | WATER DAMAGE | 7/18/2026 | U_100077 | C_01883778 |

USER GENERATED TAG COLLECTION SYSTEM AND METHOD

CROSS REFERENCE TO RELATED APPLICATION

This is a continuation of U.S. patent application Ser. No. 16/809,121, entitled "USER GENERATED TAG COLLECTION SYSTEM AND METHOD," filed Mar. 4, 2020, the entire contents of which is incorporated herein by reference for all purposes.

BACKGROUND

An entity, such as an enterprise that analyzes risk information, may want to analyze large amounts of data, such as image data. For example, a risk enterprise might want to analyze tens of thousands of image files to look for patterns (e.g., a particular type of damage has occurred more frequently under particular circumstance). Note that an entity might analyze this data in connection with different types of risk-related applications, and, moreover, different applications may need to analyze the data differently. For example, a picture of a business or residence might have different meanings depending on the types of risk being evaluated. It can be difficult to identify patterns across such large amounts of data and different types of applications. In addition, manually managing the different needs and requirements (e.g., different business logic rules) associated with different applications can be a time consuming and error prone process.

Artificial Intelligence ("AI") can accelerate the rate at which an enterprise can analyze data. AI capabilities, however, rely upon the manual curation of a "golden" or "ground truth" datasets (that typically involves a significant amount of time) and the strength of the AI is directly correlated to the accuracy and quality of the golden dataset. Note that creating a high-quality dataset to train machine learning and similar AI models can be a costly and time-consuming project.

As a result, it would be desirable to provide systems and methods to efficiently and accurately tag documents (including traditional document files, images, structured and unstructured text, audio and video files) in connection with risk-related and other applications.

SUMMARY OF THE INVENTION

According to some embodiments, systems, methods, apparatus, computer program code and means are provided for efficiently and accurately tagging document data. In some embodiments, an input document is received at a tagging platform, via a communication device, and associates it with a tag request. The tagging platform automatically selects at least one electronic record associated with a first user from a user data store containing electronic records associated with users (each record including at least a user identifier and a user communication address). The input document and tag request are transmitted to the communication address associated with the first user, and a document tag is received from the first user. The tagging platform may then store the document tag in a document mining result database by adding an entry to the database identifying the received document tag and transmit an indication associated with the document mining result database to a plurality of risk applications.

Some embodiments provide: means for receiving an input document at a tagging platform via a communication device; means for associating the input document with a tag request; means for automatically selecting at least one electronic record associated with a first user from a user data store containing electronic records associated with users, each electronic record including at least a user identifier and a user communication address; means for transmitting the input document and tag request to the communication address associated with the first user; means for receiving a document tag from the first user; means for storing the document tag in a document mining result database by adding an entry to the database identifying the received document tag; and means for transmitting an indication associated with the document mining result database to a plurality of risk applications A technical effect of some embodiments of the invention is an improved and computerized way of tagging document information to provide improved results for risk-related and other applications. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 18 illustrates a tabular portion of a document tagging result database in accordance with some embodiments.

DETAILED DESCRIPTION

The present invention provides significant technical improvements to facilitate a monitoring, tagging, and/or processing of document-related data, predictive image and risk related data modeling, and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the areas of document monitoring, tagging, and/or processing by providing benefits in data accuracy, analysis speed, data availability, and data integrity, and such advances are not merely a longstanding commercial practice. The present invention provides improvement beyond a mere generic computer implementation as it involves the processing and conversion of significant amounts of data in a new beneficial manner as well as the interaction of a variety of specialized risk-related applications and/or third-party systems, networks and subsystems. For example, in the present invention document related risk information may be processed, tagged, forecast, and/or predicted via an analytics engine and results may then be analyzed efficiently to evaluate risk-related and other data, thus improving the overall performance of an enterprise system, including message storage requirements and/or bandwidth considerations (e.g., by reducing a number of messages that need to be transmitted via a network). Moreover, embodiments associated with predictive models might further improve the performance of claims processing applications, resource allocation decisions, reduce errors in templates, improve future risk estimates and document tags, etc.

Some embodiments described herein are associated with a web application (or similar program) that lets data scientists crowd source document labeling ("tagging") work to users, such as employees (e.g., who volunteer or opt-in), to accelerate document tagging and bring costs down to enable underwriting and other use cases. For example, an image factory may use AI to let an underwriting process make better decisions, reduce repetitive or redundant workflow components, bring automation to new and renewal low risk business, and/or identify complex cases that may require further (manual) review. For example, in some embodiments, a web application may let employees label images using a link sent to their e-mail. The application may track users, images, labels, timing, and/or tagging campaign information as desired. In some embodiments, users and campaigns may be manually configured by a data science team.

Figure 1:
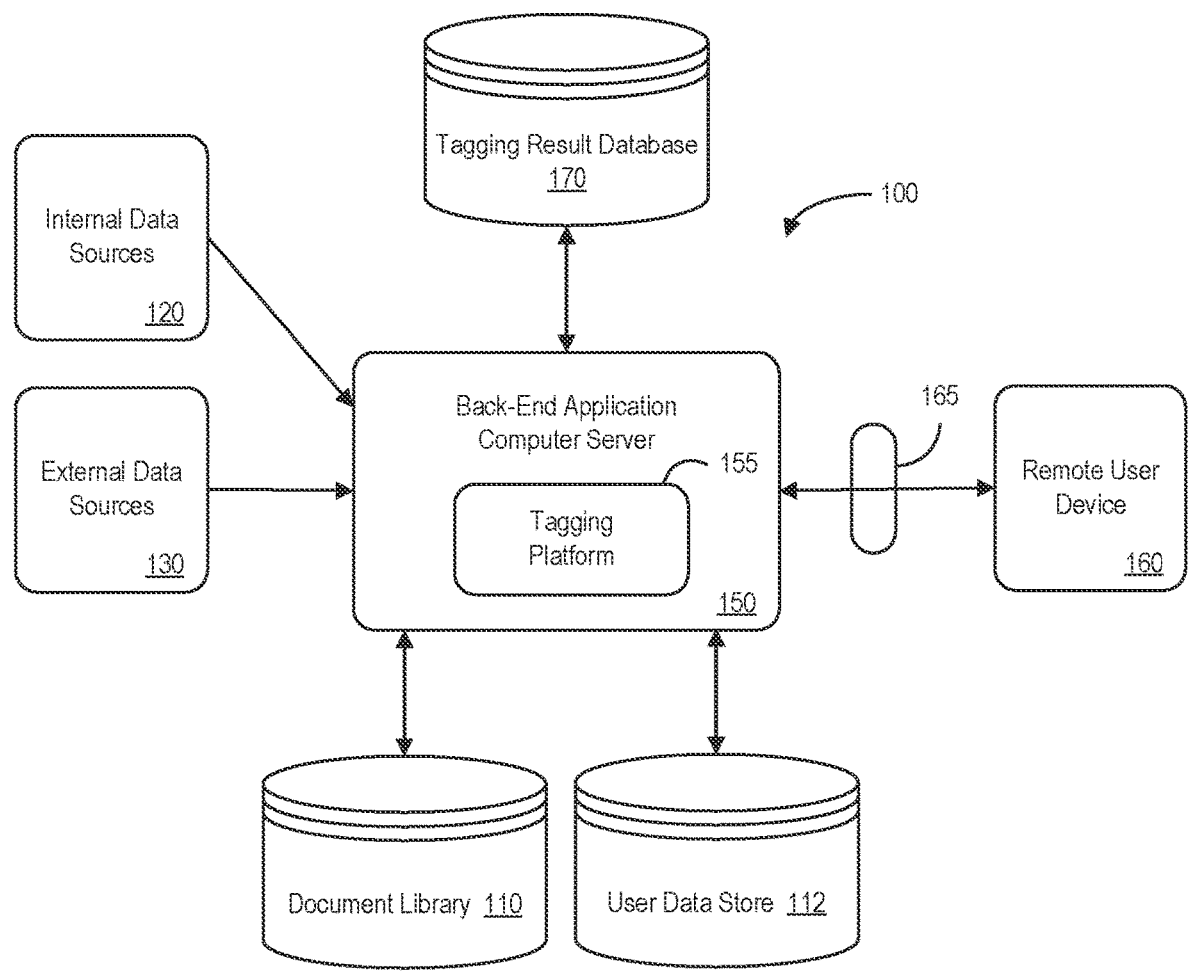
FIG. 1 is a high-level block diagram of a document tagging system in accordance with some embodiments.

FIG. 1 is a high-level block diagram of a document tagging system 100 in accordance with some embodiments. In particular, the system 100 includes a back-end application computer 150 server that may access information in a document library 110 and user data store 112 (e.g., storing a set of electronic records that represent employees or other users who may tag documents, each record including, for example, one or more user identifiers, quality scores, communication addresses, etc.). The back-end application computer server 150 may also retrieve information from internal data sources 120 (e.g., internal to an insurance company or an employer system) and/or external data sources 130 (e.g., third-party data) in connection with an automated document tagging platform 155. According to some embodiments, the system 100 further applies machine learning, artificial intelligence algorithms, business logic, and/or other models to the electronic records. The back-end application computer server 150 may also exchange information with a remote user device 160 (e.g., via communication port 165 that might include a firewall). According to some embodiments, an interactive graphical user interface platform of the back-end application computer server 150 (and, in some cases, third-party data) may facilitate the display of information associated with the document tagging platform 155 via one or more remote computers (e.g., to enable a manual review of submitted tags) and/or the remote user device 160. For example, the remote user device 160 may receive documents and tag requests from the back-end application computer server 150. The user may then review the data from the document library 110 and provide a reply in response to communications. Note that the back-end application computer server 150 and/or any of the other devices and methods described herein might be associated with a cloud-based environment and/or a vendor that performs a service for an enterprise.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate communications with remote user devices 160 and/or updates of electronic records in the document library 110 and user data store 112. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the document library 110, the user data store 112, and a document tagging database 170. The document tagging database 170 may store document tags supplied by users and be utilized to train AI models. The document library 110 and user data store 112 may also contain information about prior and current interactions with users, including those associated with the remote user devices 160 (e.g., user preference values associated with data formats, protocols, etc.). The document library 110 and user data store 112 may be locally stored or reside remote from the back-end application computer server 150. As will be described further below, the document library 110 and user data store 112 may be used by the back-end application computer server 150 in connection with an interactive user interface to gather information for the automated document tagging platform 155. Although a single back-end application computer server 150 is shown in FIG. 1, any number of such devices may be included. Moreover, various devices described herein might be combined according to embodiments of the present invention. For example, in some embodiments, the back-end application computer server 150, the document library 110, and the user data store 112 might be co-located and/or may comprise a single apparatus.

Figure 2:
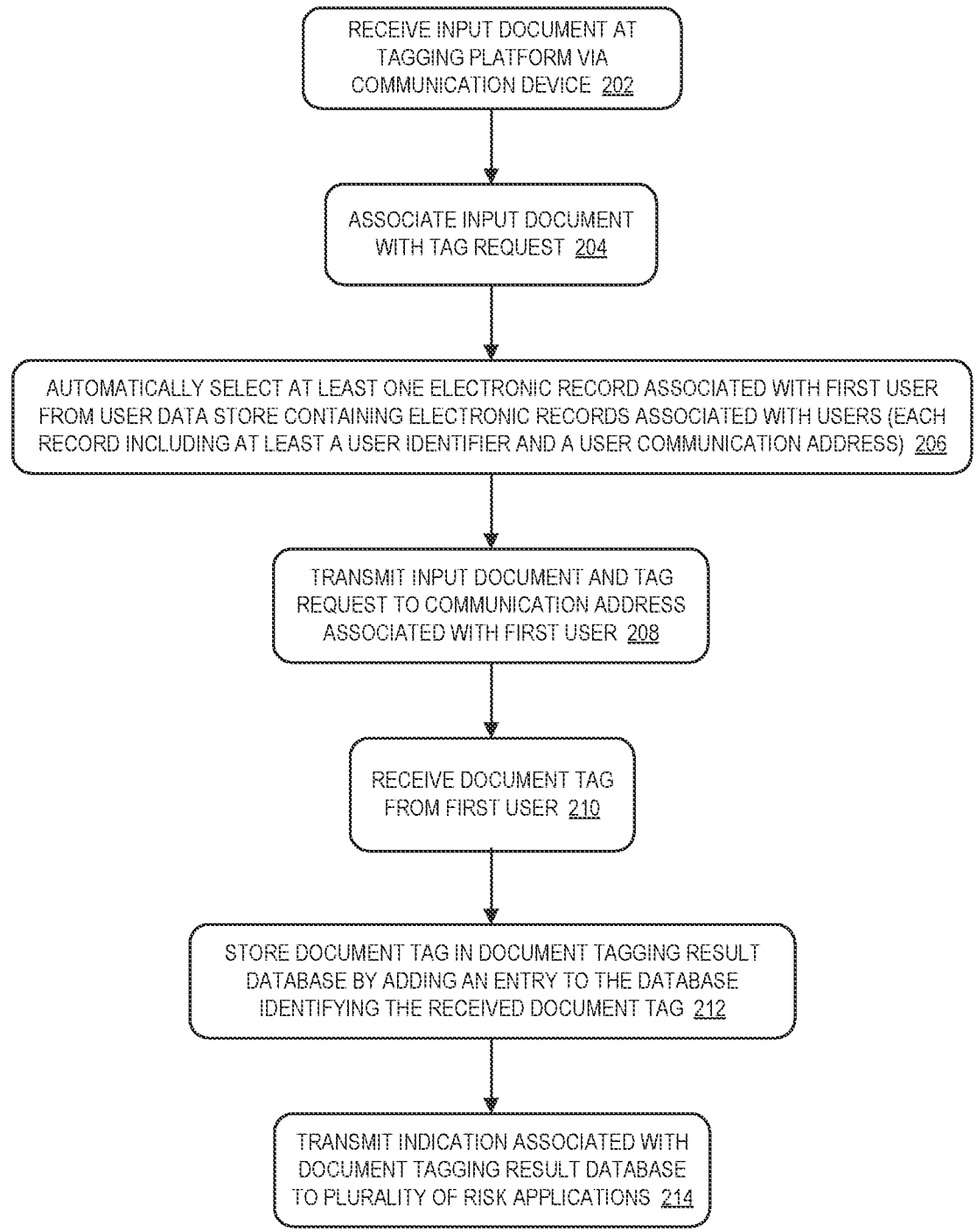
FIG. 2 is a document tagging method according to some embodiments.

In this way, the system 100 may tag document information in an efficient and accurate manner. For example, FIG. 2 illustrates a method that might be performed by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, the system may receive an input "document" at a tagging platform via a communication device. As used herein, the term "document" may refer to an image (e.g., a satellite photograph, a drone picture, a street-view picture, etc.), a word processing document (e.g., a police or medical report), a video, an audio file, etc. Also note that a document may be newly "received" by an enterprise (e.g., it might arrive from an external source or a separate internal system via an electronic message). In some embodiments, a document may instead be "received" by accessing an existing document (e.g., an image file might be retrieved from an archive or warehouse that contains a collection of insurance-related images taken over the past 20 years). At 204, the system may associate the input document with a tag request. For example, the tag request might ask a user "is there visible damage to the roof in this picture?" As another example, the tag request might ask a user "does the customer's voice seem angry or annoyed in this audio clip?" As still another example, a campaign to identify boarded windows may ask users to select "yes" if boarded windows are present in an image or "no" if no boarded windows are present. Note that the tag request does not need to be a "yes" or "no" question. For example, a campaign to identify roof condition may ask users to select whether a roof is "below average," "average," or "above average." Similarly, a tag request might ask for a numerical rating (e.g., from "1" through "10").

At 206, at least one electronic record (associated with a first user) may be automatically selected from a user data store containing electronic records associated with users, each electronic record including at least a user identifier and a user communication address. By way of examples, the communication address might refer to a postal address, an email address, a smartphone telephone number, a link, a username and password, or any other communication link that might be automatically established by the system.

The input document and tag request may then be transmitted to the communication address associated with the first user at 208. At 210, the system may receive a document tag from the first user and store the document tag in a document mining result database (by adding an entry to the database identifying the received document tag) at 212. Note that, as used herein, the term "tag" might refer to any object describing a document. Examples of tags might include, an asphalt condition, an estimated building age, a building style, the presence of concrete, a building condition, siding materials, an angle of view, a fence, barbed wire, chipped paint, a dirt patch, manicured plants, a boarded window, a broken window, an overall image quality, etc.

At 214, the system may transmit an indication associated with the document mining result database to a plurality of risk applications (e.g., to train AI models to be used in connection with an underwriting process, a claims handling procedure, etc.).

Figure 3:
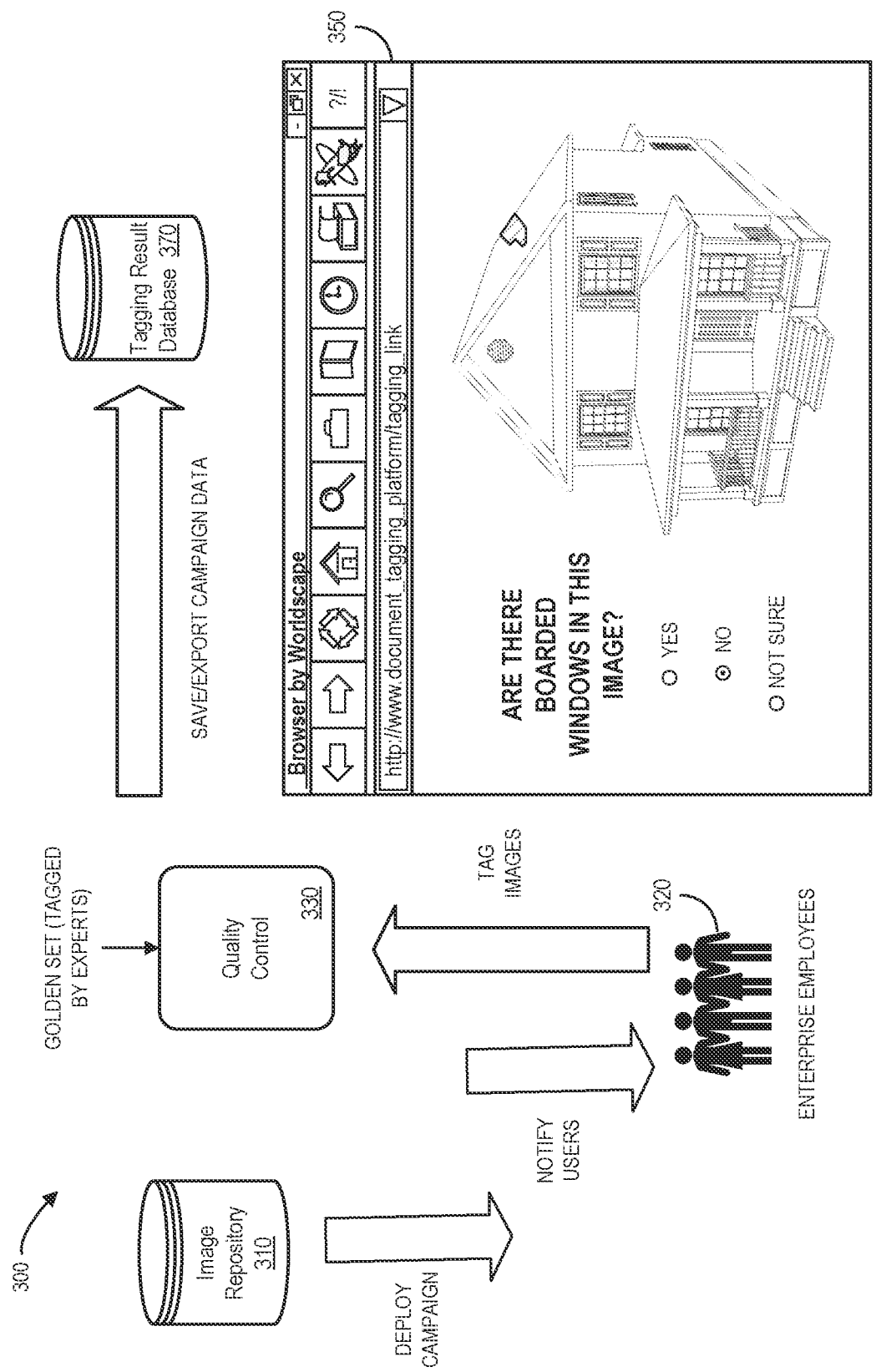
FIG. 3 illustrates an image factory tagging application use case in accordance with some embodiments.

FIG. 3 illustrates an image factory tagging application use case 300 in accordance with some embodiments. Initially, an image may be retrieved from an image repository 310 when a labeling or tagging campaign is deployed. Images may then be transmitted to users, such as employees 320 of an enterprise (e.g., people who work for or with an insurer). Information that might be associated with such a campaign might include, for example, a configuration file, a campaign or task description, one or more questions about the images, the image itself (e.g., an image file path), a list of potential tags, a sample image (e.g., showing a cracked sidewalk), a minimum number of taggers per image, an indication of enrolled users, etc.

A user interface 350 may then be used to collect tagging decisions from users. According to some embodiments, a quality control process 330 may inject a golden data set (tagged by experts) to automatically perform quality control on new tags submitted by novice/non-experts such as the employees 320 (e.g., to facilitate crowd sourcing/scaling-up the use case 300). The campaign data may then be saved into a tagging result database 370. The results might include, for example, a campaign identifier, a campaign start date, a campaign end date, image tag data (including image and user identifiers, user tag selections, an amount of time taken to tag the image), etc.

According to some embodiments, users or employees might receive a reward, such as an icon or badge, in exchange for participating in a campaign. For example, a badge might be displayed on an employee's computer screen after he or she tags 2,000 documents to broaden the AI capabilities of an enterprise by helping to train a model identify patterns from images, video/voice recordings, documents, etc. using large volumes of manually labeled data.

Figure 4:
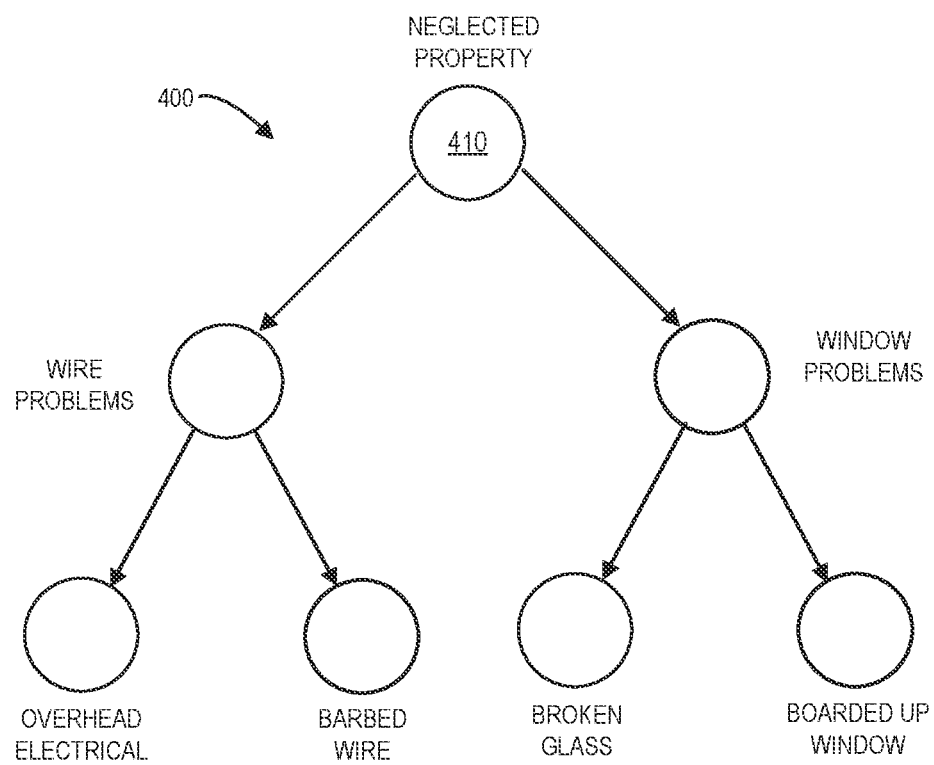
FIG. 4 illustrates a document tag hierarchy according to some embodiments.

In some cases, the system may transmit a series of tag requests to one or more users that is dynamically adjusted based on prior tags generated by that user (or by other users). For example, FIG. 4 illustrates a document tag hierarchy 400 according to some embodiments. Here, an initial question 410 might as the user if a building looks like a "neglected property." If so, the system might follow up with a tag request asking if there is a "wire problem" or "window problem." If the user indicates that a window problem exists, he or she may be asked if there is "broken glass" or "boarded up windows," etc. In this way a machine learning model can be trained to accurate interpret documents.

Figure 5:
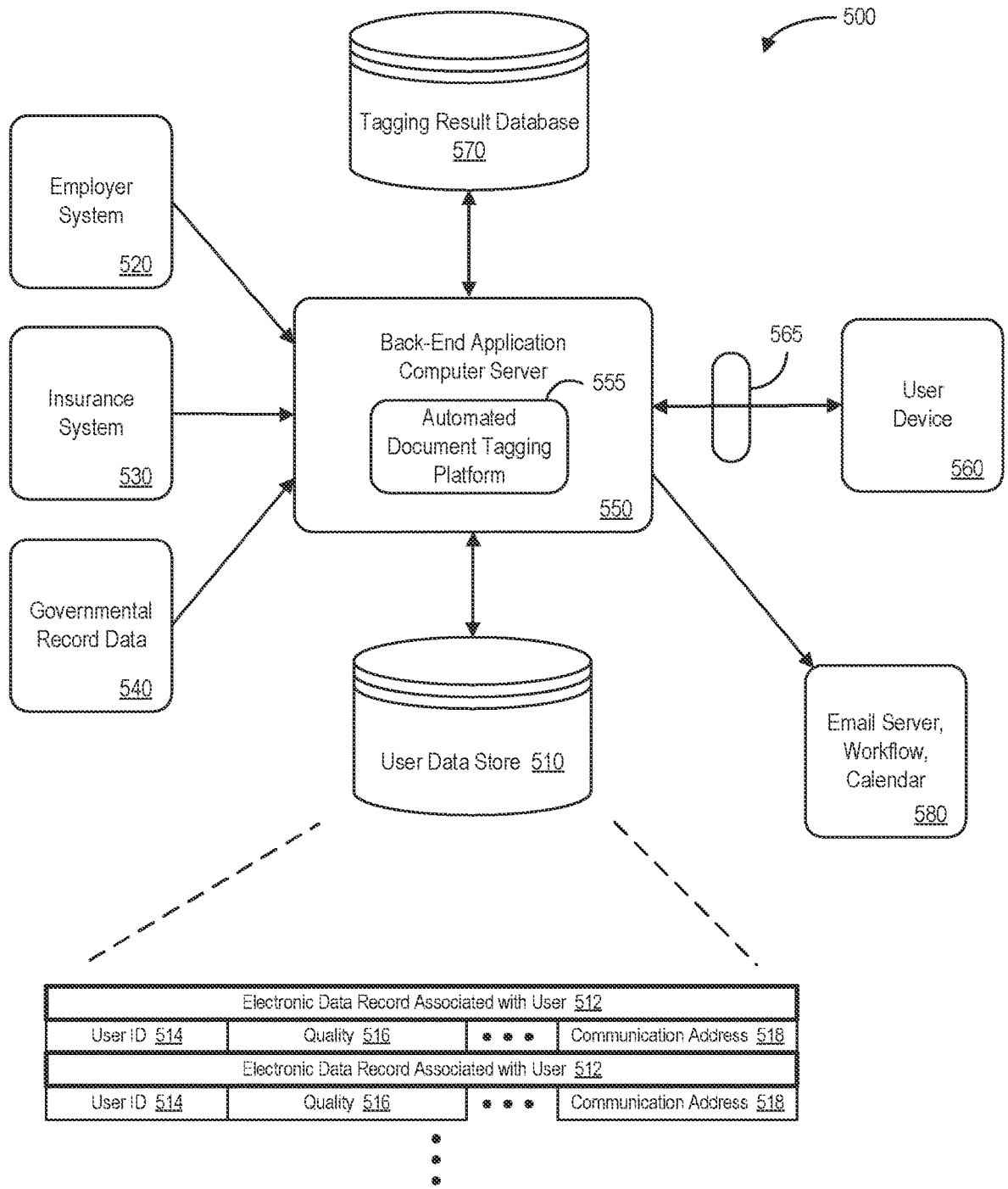
FIG. 5 is a more detailed diagram of a document tagging system in accordance with some embodiments.

FIG. 5 is a more detailed diagram of a document tagging system 500 in accordance with some embodiments. As before, the system 500 includes a back-end application computer server 550 that may access information in a user data store 510. The back-end application computer server 550 may also retrieve information from an employer system 520 (e.g., a human resources spreadsheet listing employees and office addresses), an insurance system 530, and/or government record data 540 in connection with an automated document tagging platform 555. According to some embodiments, the government record data 540 might be associated with satellite image data. Note that various data elements from the user data store 510, employer system 520, insurance system 530, and/or government record data 540 might be combined, merged, verified, etc. and the results may be stored in a tagging result database 570. The back-end application computer server 550 may also exchange information via communication links to user devices 560 (e.g., via a communication port 565 that might include a firewall) to communicate with people who will manually tag the documents. The back-end application computer server 550 might also transmit information directly to an email server (e.g., to send documents and tag requests), a workflow application, and/or a calendar application 580 (e.g., to schedule future tag requests) to facilitate automated communications and/or other system actions.

The back-end application computer server 550 may store information into and/or retrieve information from a user data store 510. The user data store 510 might, for example, store electronic records 512 representing a plurality of insurance company employees, each electronic record including a user identifier 514, a user quality 516 (e.g., described in connection with FIG. 8), a communication address 518, etc. According to some embodiments, the system 500 may also provide a dashboard view of a tagging campaign (e.g., including a number of documents that have been tagged, tag results, etc.).

By way of example, to support AI model development the system 500 might tag or label over 9,000 property survey images. Three different people may apply tags to each image. Note that consistency in tagging may provide confidence in labeling accuracy. Key factors that may impact low tagging consistency and strategies for mitigation may include:

- the number and availability of labelers (which might be mitigated by an on-demand team scale);
- domain expertise (which might be mitigated by provide precise task definitions and examples);
- variation in perception of task (which might be mitigated by encouraging accuracy and consistency across labelers using multiple votes to increase confidence);
- complexity of tagging task (which might be mitigated by split tasks into multiple iterations to first identify windows and then assess condition);
- difficulty in accurately applying a variety of tags at once (which might be mitigated by limiting the number of tags per campaign by splitting different concepts into separate tasks);
- lack of review during tagging process (which might be mitigated by implementing quality assurance early and often in the tagging process);
- user interface limitations (which might be mitigated by including integrated samples with instructions easily visible); and
- inability to track multiple taggers (which might be mitigated by tool to enable parallelism of tagging for the same image set).

Figure 6:
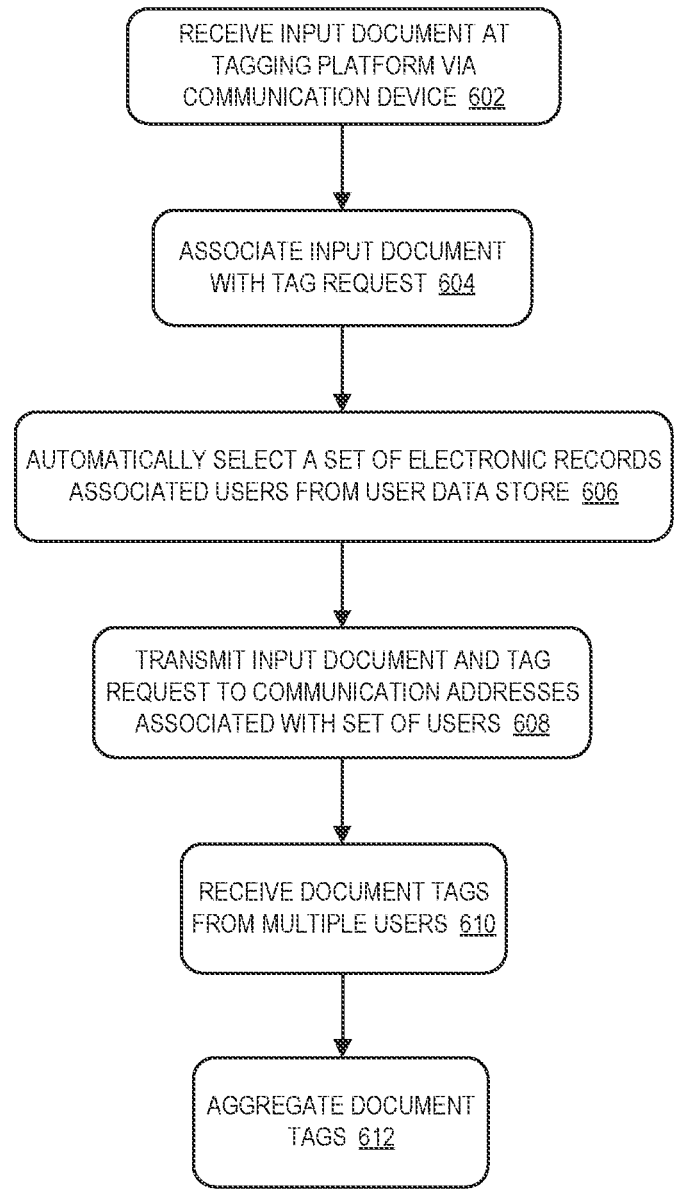
FIG. 6 is a document tag aggregation method according to some embodiments.

One way to improve the quality of tags is to combine tags from multiple users (e.g., a final tag is only assigned if 75% of all users agree that the tag is appropriate). FIG. 6 is a document tag aggregation method according to some embodiments. At 602, the system may receive an input document (e.g., an image file) at a tagging platform via a communication device. At 604, the system may associate the input document with a tag request. At 606, a set of multiple electronic records (associated with multiple users) may be automatically selected from a user data store containing electronic records associated with users, each electronic record including at least a user identifier and a user communication address.

The input document and tag request may then be transmitted to the set of communication addresses associated with the multiple users at 608. At 610, the system may receive document tags from the multiple users. At 612, the system may aggregate document tags. For example, the system may treat each tag as a "vote" and determine which tag received the most votes. In some embodiments, a close vote (e.g., 55% of users indicate that barbed wire is present) is automatically and dynamically supplemented by requesting additional tags from other users (e.g., other employees, experts, managers, etc.).

Figure 7:
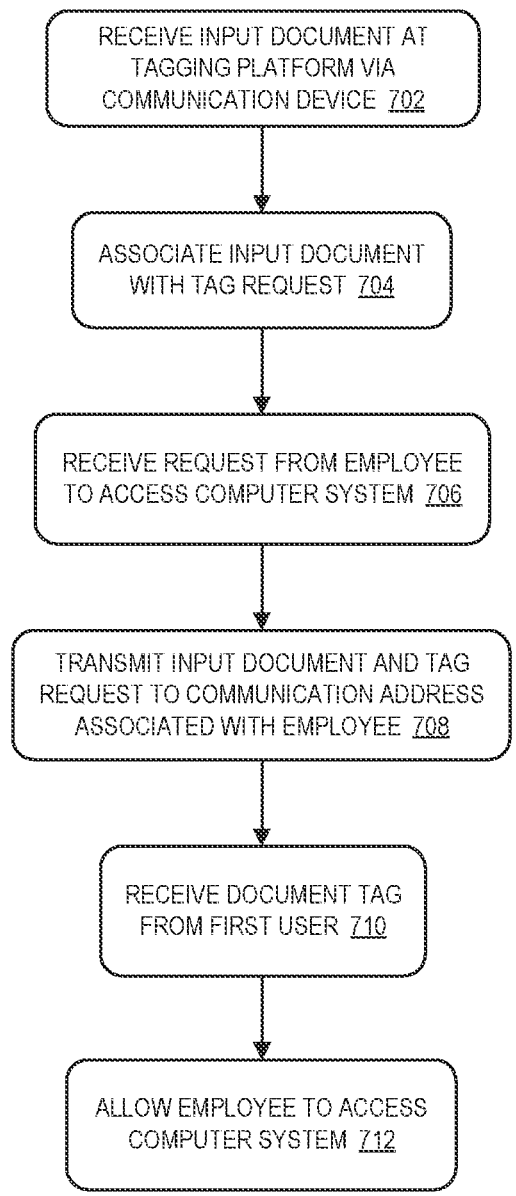
FIG. 7 is an employee access document tagging method in accordance with some embodiments.

In some embodiments, a privilege or reward might be provided to users who supply tags. For example, FIG. 7 is an employee access document tagging method in accordance with some embodiments. At 702, the system may receive an input document (e.g., an image file) at a tagging platform via a communication device. At 704, the system may associate the input document with a tag request. At 706, the system may receive from an employee of an enterprise a request to access a computer system (e.g., he or she attempts to log into a computer system when he or she arrives at the office in the morning). The input document and tag request are then be transmitted to the employee at 708 (e.g., to be displayed on a login screen). At 710, the system may receive one or more document tags from that employee. Now that the tagging has been performed, at 712 the system may then let the employee log into the computer system.

In this way, the insurer may use the tags to harness computer vision and extract custom insights from images for underwriters and claim teams. Note that AI models might be able to understand patterns related to neglect, roof condition, parking lot condition, etc. These models, however, need labeled data to work (and the more data, the better). Manually curating data is expensive, time consuming, and inefficient to scale with high quality. Some embodiments described herein use an internally hosted web application to enable crowdsourcing of labeling work within the company. If every employee spends five minutes labeling images per day, a relatively large enterprise could collect tags for millions of images in a single a year. Such an application may also enable data science teams to iterate faster on tagging and validation work during model development cycle. For example, the same tagging application can be leveraged to get feedback on models in production and help refine the models over time.

Figure 8:
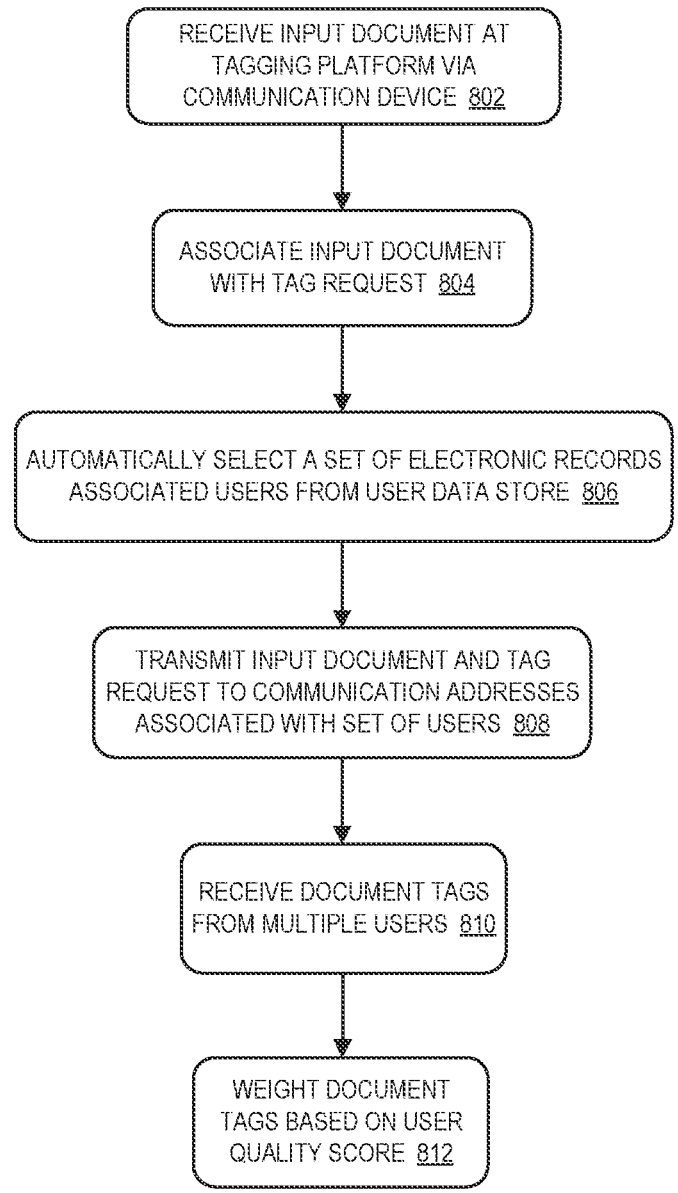
FIG. 8 is a multi-user document tag weighting method based on a user quality score according to some embodiments.

Some embodiments may associate each user with a "quality score" related to the tags that have provided. For example, a majority of an individual's tags might need align with at least one other source of "truth." Depending on the campaign, tags may be compared to an existing ground truth (e.g., the most accurate dataset available for a given attribute) or tags sources from others who participated in the campaign. FIG. 8 is a multi-user document tag weighting method based on a user quality score according to some embodiments.

One way to improve the quality of tags is to combine tags from multiple users (e.g., a final tag is only assigned if 75% of all users agree that the tag is appropriate). FIG. 8 is a document tag aggregation method according to some embodiments. At 802, the system may receive an input document (e.g., an image file) at a tagging platform via a communication device. At 804, the system may associate the input document with a tag request. At 806, a set of multiple electronic records (associated with multiple users) may be automatically selected from a user data store containing electronic records associated with users (with each record including a user identifier, a user quality score, and communication address). The input document and tag request may then be transmitted to the set of communication addresses associated with the multiple users at 808. At 810, the system may receive document tags from the multiple users. At 812, the system may weight document tags based on the user quality scores. For example, a tag submitted by a user who consistently provides accurate tags may be scored more highly as compared to one from user who frequently provides incorrect tags. Note that a number of different factors may impact quality, including tagger inconsistencies, tag complexity, the number of tags per batch, the number of objects in image, image quality, etc.

Figure 9:
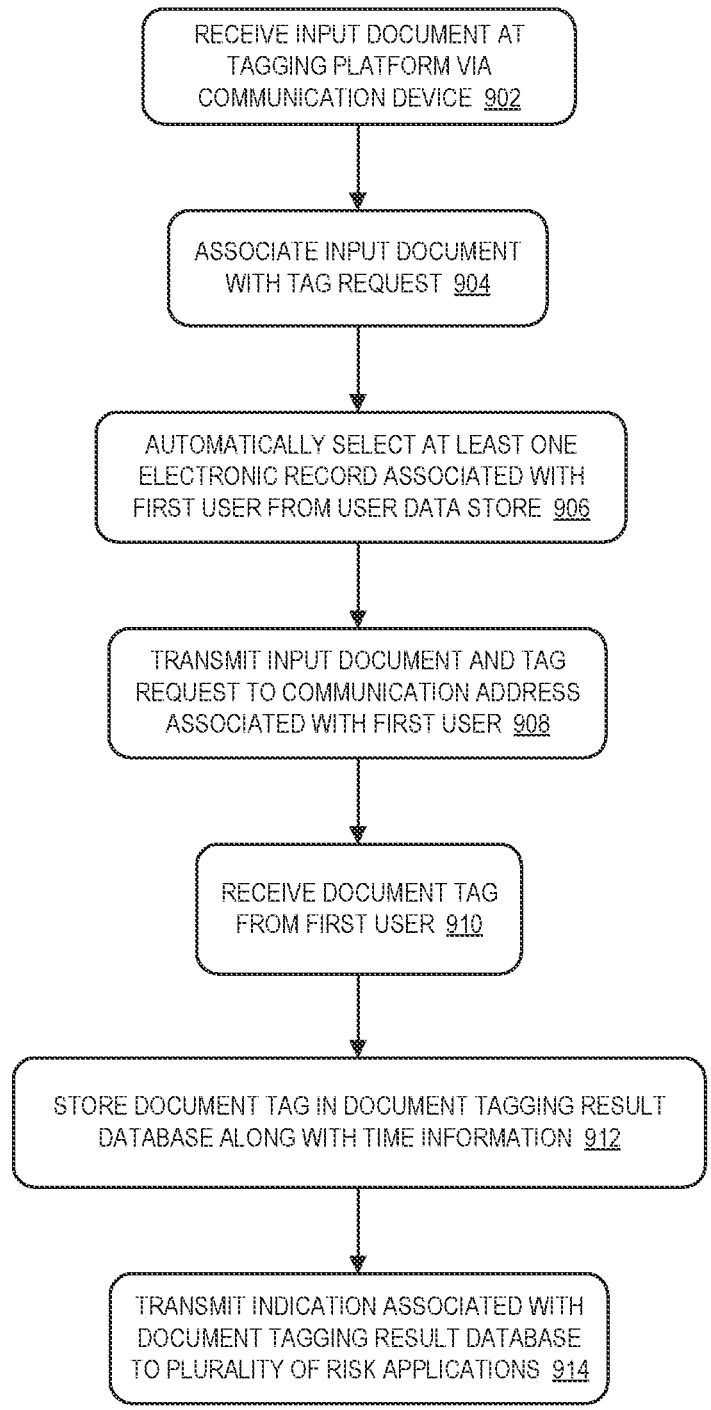
FIG. 9 is a document tagging method utilizing time information in accordance with some embodiments.

According to some embodiments, time information may be analyzed in connection with the document tagging process. For example, FIG. 9 is a document tagging method utilizing time information in accordance with some embodiments. At 902, the system may receive an input document at a tagging platform via a communication device. At 904, the system may associate the input document with a tag request. At 906, at least one electronic record (associated with a first user) may be automatically selected from a user data store containing electronic records associated with users, each electronic record including at least a user identifier and a user communication address. The input document and tag request may then be transmitted to the communication address associated with the first user at 908. At 910, the system may receive a document tag from the first user and store the document tag in a document mining result database at 912 along with time information. For example, the system might measure an amount of time associated with the document tag (how long did the user take to assign a tag to this image?). Other examples, of time information include a time of day associated with the document tag (morning or afternoon?), a day of week associated with the document tag (weekday or weekend?), and a time of year associated with the document tag (spring or autumn?). At 914, the system may transmit an indication associated with the document mining result database to a plurality of risk applications (e.g., to train AI models associated with an underwriting process, a claims handling procedure, etc.).

Figure 10:
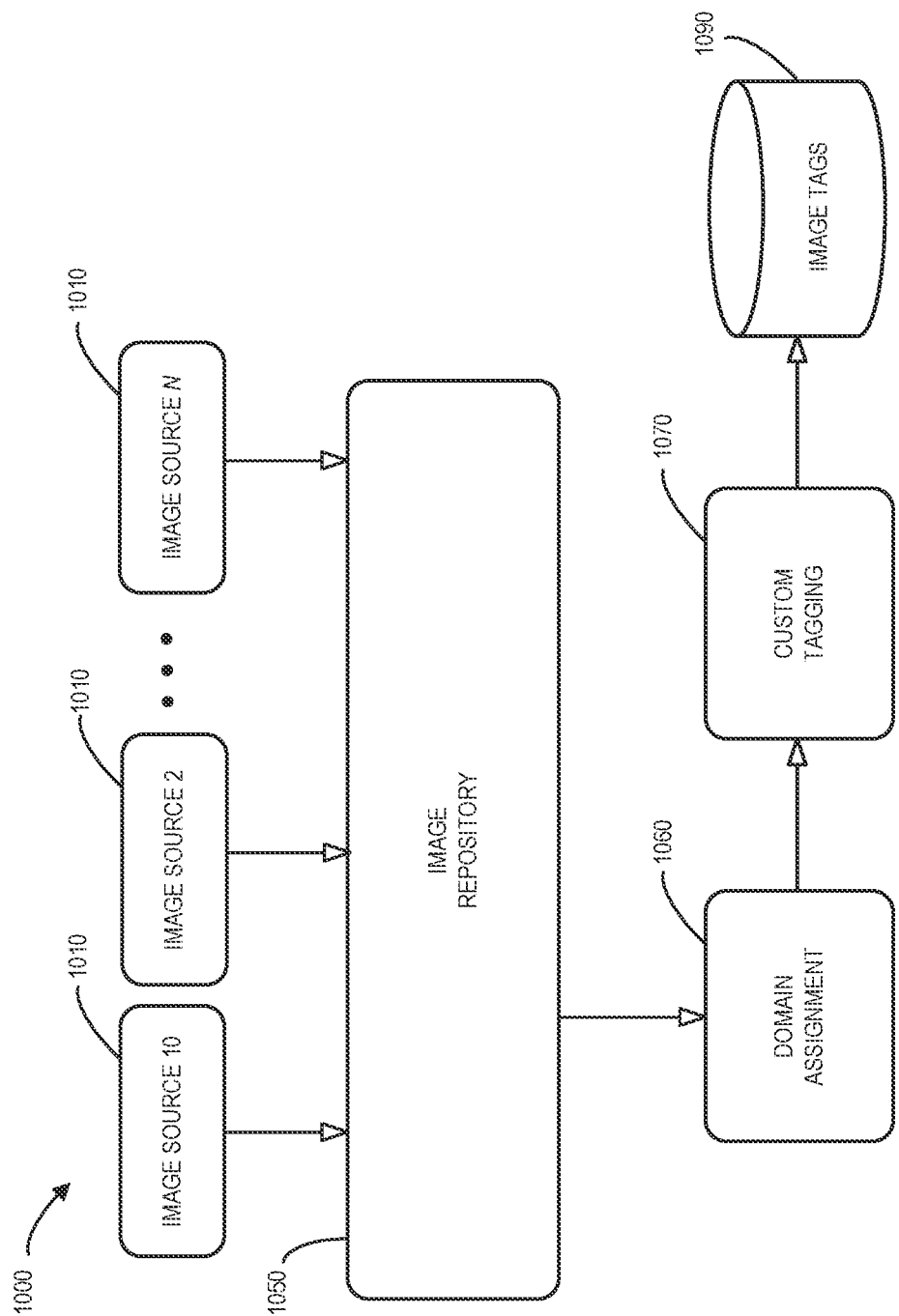
FIG. 10 is block diagram of a system according to some embodiments of the present invention.

FIG. 10 is block diagram of a system 1000 according to some embodiments of the present invention. An image repository 1050 may receive and store image data from various image sources 1010 (e.g., image sources 10 through N illustrated in FIG. 10). As used herein, the phrase "image information" may refer to any representation of visual data including photographs (e.g., Joint Photographic Experts Group ("JPEG") files, Exchangeable Image File ("EXIF") data, Tagged Image File Format ("TIFF") files, Graphics Interchange Format ("GIF") files, bitmap ("BMP") files, Portable Network Graphics ("PNG") files, etc.), drawings, video files (e.g., Audio Video Interleave ("AVI") files, Flash Video Format ("FVL") data, Windows Media Video ("WMV") files, Apple QuickTime Movie ("MOV") data, Moving Pictures Expert Group 4 ("MPG4") files, etc.), streams of visual information, etc. Note that image information may represent uncompressed or compressed data, lossy or lossless compression techniques, etc. Image information might be generated via, for example, a camera, a smartphone, a video camera, a drone (e.g. to record images of a building roof), etc. Image information might include color images, black and white images, infrared images, etc.

Ingestion of image information into the image repository 1050 may include key assignment and ingestion of existing tags (e.g., latitude and longitude) that are associated with the images. Information from the image repository 1050 may then be processed to determine an appropriate domain assignment 1060 (e.g., using general image tag learning and artificial intelligence) and an automated document tagging platform 1070 (e.g., to crowdsource tags from users) to create a broad set of image tags to be stored in an image tag database 1090 (which can then be used to train AI models).

Figure 11:
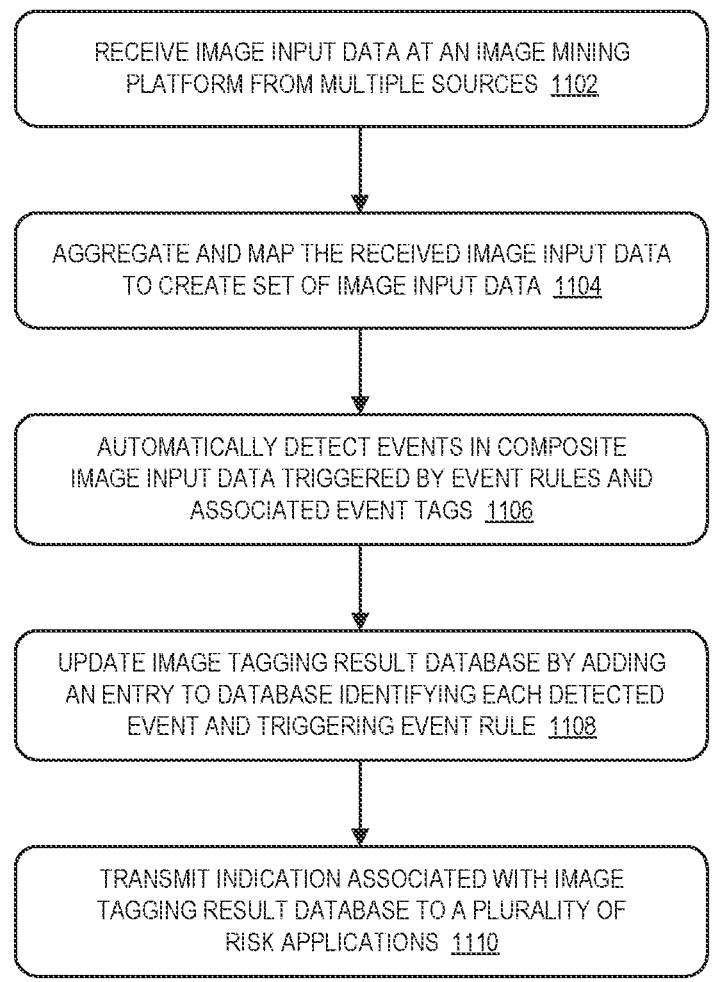
FIG. 11 illustrates a method in accordance with some embodiments of the present invention.

In this way, the system 1000 may collect image information in an efficient and accurate manner. Note that a system might attempt to automatically "mine" or assign tags to a document (and then compare those tags to user submitted tags and/or use the automatically assigned tags to create tag requests). For example, FIG. 11 illustrates a method that might be performed by some or all of the elements of the system 1000 described with respect to FIG. 10 according to some embodiments of the present invention. At 1102, image input data is received at an image mining platform from multiple sources. For example, thousands of risk files (e.g., associated with insurance claims or other types of risk-related data) may be received on a periodic basis or in substantially real time. Although risk files are described in connection with some embodiments herein, note that other types of information may also be received and/or analyzed. For example, the image input data might be associated a risk note, a medical report, a police report, social network data, web image data, Internet of Things ("IoT") data, Global Positioning System ("GPS") satellite data, activity tracking data, a loss description, an injury description, an image associated with a Final Notice Of Loss ("FNOL") statement, a video chat or teleconference, third-party data, and/or a governmental agency (e.g., satellite photos).

At 1104, the received image input data is aggregated and mapped to create composite input image data. For example, the received image input data might be rearranged, converted into a standard format, fields may be mapped in accordance with a source identifier, common items within the images may be identified and/or extracted, etc.

At 1106, an event may be automatically detected in the set of image input data triggered by a rule and an associated tag. According to some embodiments, the tag may be associated with the triggering detection of an item, such as a building, an automobile, a street sign, etc. The triggering rule might be associated with, for example, multiple sub-items being detected within a single image (e.g., both an automobile and broken glass, ice on a staircase, etc.). According to some embodiments, the triggering rule was previously defined by an administrator using a graphical user interface or an AI model trained with crowdsource supplied tags. In some cases, one or more pre-determined conditions may be applied to flag the document tag (e.g., to reduce the number of tags to be eventually reported to risk applications). For example, a pre-determined condition may require that an item must be detected a pre-determined number of times or within a pre-determined proximity of another item.

An image tagging result database may be updated at 1108 by adding an entry to the database identifying the detected event (note that, if applicable, only flagged tags may result in a new entry being created in the database). The added entry might, for example, include an image identifier, an insert date, an image source, a rule identifier, and/or a line of business.

At 1110, an indication associated with the image tagging result database may be transmitted to a plurality of risk applications. The risk applications might be associated with, for example, a workers' compensation claim, a personal risk policy, a business risk policy, an automobile risk policy, a home risk policy, a sentiment analysis, risk tag detection, a cluster analysis, a predictive model, a subrogation analysis, fraud detection, a recovery factor analysis, large loss and volatile claim detection, a premium evasion analysis, a risk policy comparison, an underwriting decision, and/or indicator incidence rate trending application. Some embodiments might represent use cases for risk applications associated with various phases of an insurance process (e.g., a prospecting flow, a quoting flow, a pricing flow, a book management flow, a policy renewal flow, etc.). Note that the transmitted indication might be used to trigger a risk application (e.g., by triggering a fraud detection analysis) and/or update a risk application (e.g., by updating a variable or weighing factor of a predictive model). According to some embodiments, the system may then receive, from at least one of the risk applications, feedback information associated with the document tag. Based on the received feedback information, the system may automatically update at least one of the rule and/or the associated tag. For example, a rule or tag might be automatically updated to improve operation of the system when it is detected that users or underwriters are constantly correcting an image data evaluation in a particular way. That is, manual adjustments to and corrections of image processing results may be automatically used by the system to learn how to improve the rules and associated tags that are generated in future evaluations.

Figure 12:
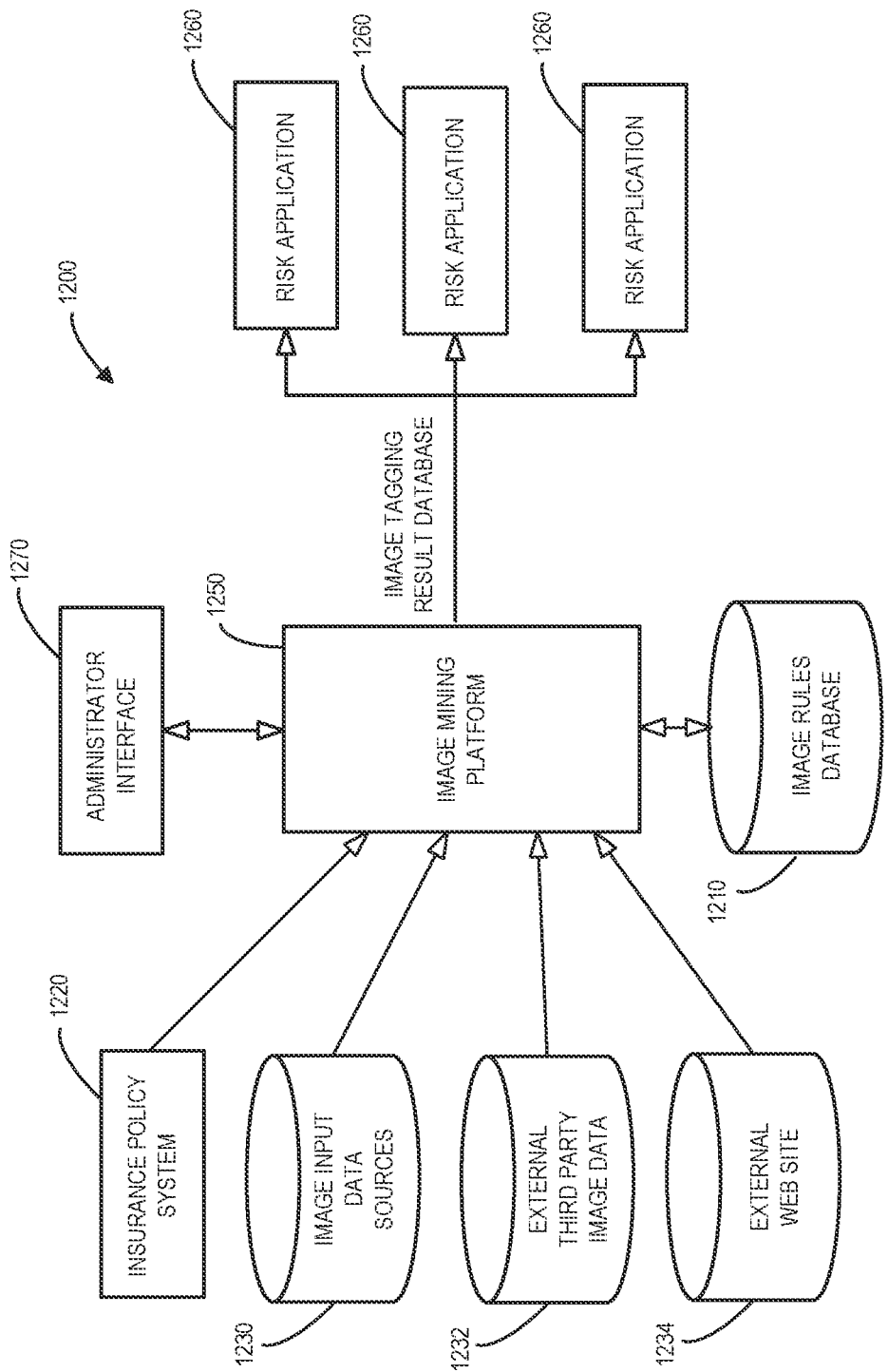
FIG. 12 is a more detailed implementation of a system according to some embodiments.

FIG. 12 is block diagram of a system 1200 according to some embodiments of the present invention. In particular, the system 1200 includes an image mining platform 1250 that receives information from an image rules database 1210, an insurance policy system 1220 (e.g., associated with a claims process, appraisal process, underwriting process, etc.), one or more image input data sources 1230 (e.g., internal to a risk enterprise), external third-party image data 1232 (e.g., automobile safety reports issued by the National Highway Safety Board), and/or image data from an external web site 1234. The image mining platform 1250 may, according to some embodiments, be associated with a business organization, a crowdsource image tagging campaign, and/or a risk-related enterprise.

According to some embodiments, an "automated" image mining platform 1250 may access rules in the image rules database 1210 to mine the information from the insurance policy system 1220 and/or the other image input data sources 1230. As used herein, the term "automated" may refer to, for example, actions that can be performed with little or no human intervention.

The image mining platform 1250 may store information into and/or retrieve information from the image rules database 1210 and/or an image mining result database that is output to various external risk applications 1260 (e.g., software applications or devices associated with subrogation, fraud detection, and/or recovery factor analysis). The image rules database 1210 may be a locally stored relational database or reside remote from the image mining platform 1250. The term "relational" may refer to, for example, a collection of data items organized as a set of formally described tables from which data can be accessed. Moreover, a Relational Database Management System ("RDBMS") may be used in connection with any of the database tables described herein. According to some embodiments, a graphical administrator interface 1270 may provide an ability to access and/or modify the image rules database 1210 via the image mining platform 1250. The administrator interface 1270 might, for example, let an administrator define terms, picture dictionaries, mapping rules, etc. associated with image mining and/or crowdsource tag collection. The data sources 1230, 1232 may be thought of as "publishers" of information to be consumed by the image mining platform 1250, and the risk applications 1260 may be considered "subscribers" to information created by the image mining platform 1250. Moreover, note that the image mining platform 1250 may operate asynchronously and/or independently of any risk application 1260.

Figure 13:
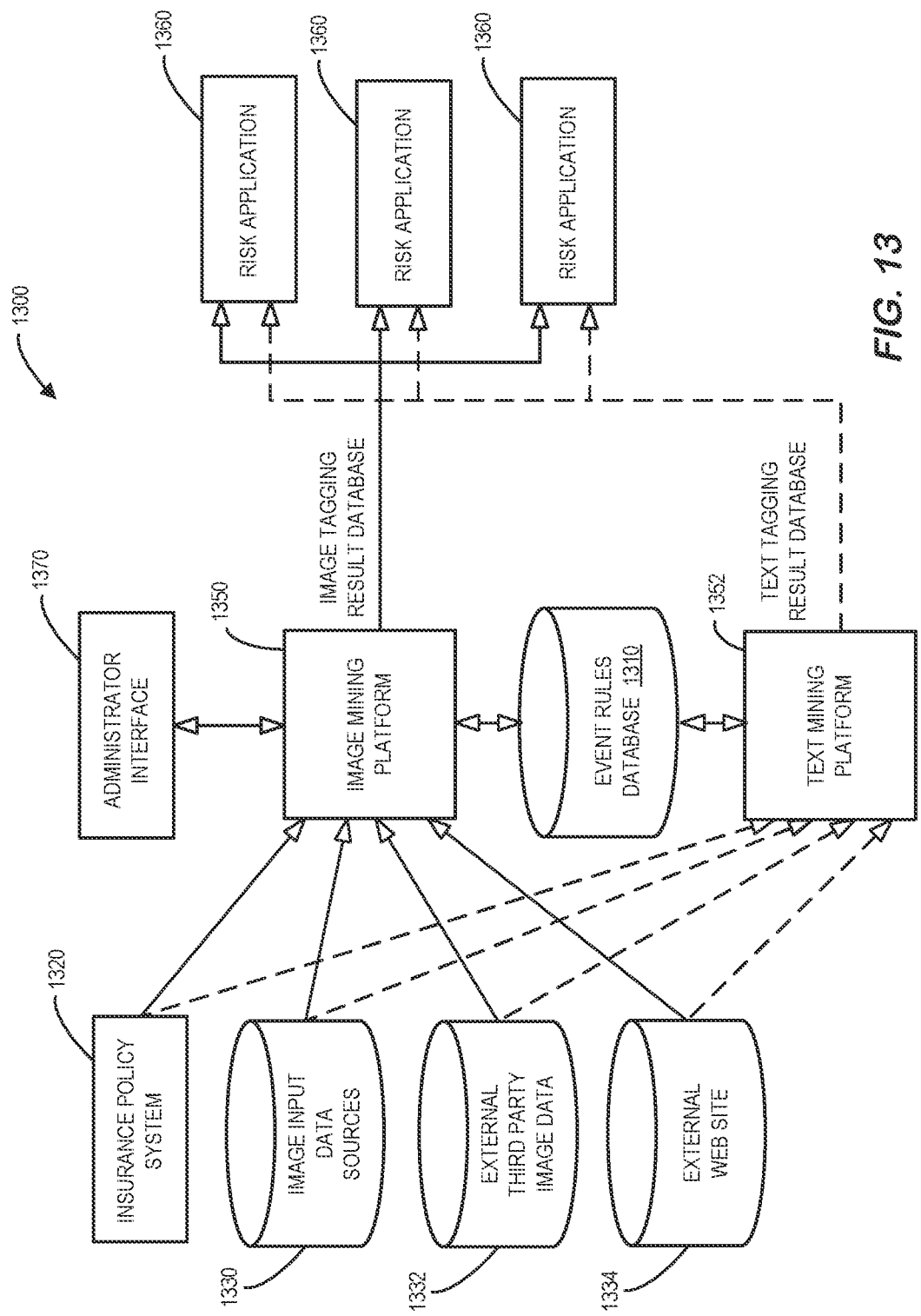
FIG. 13 is an example of a system to process images and text in accordance with some embodiments.

Note that a mining platform may process other types of data in addition to image information. For example, FIG. 13 illustrates a system 1300 to process images and text in accordance with some embodiments. As before, the system 1300 includes an image mining platform 1350 that receives information from an event rules database 1310, an insurance policy system 1320, one or more image input data sources 1330 (e.g., internal to a risk enterprise), external third-party image data 1332 (e.g., weather maps), and/or data from an external web site 1334. According to some embodiments, an automated image mining platform 1350 may access rules in the event rules database 1310 to mine the information from the insurance policy system 1320, the other image input data sources 1330, the external third-party image data 1332, the external web site 1334, and/or crowdsource campaigns. According to some embodiments, a graphical administrator interface 1370 may provide an ability to access and/or modify the event rules database 1310.

In this embodiment, the system 1300 further includes a text mining platform 1352 that also receives information from the tag rules database 1310, the insurance policy system 1320, the image input data sources 1330 (e.g., internal to a risk enterprise), the external third-party image data 1332 (e.g., weather forecast reports), and/or the external web site 1334. The text mining platform 1352 may store information into and/or retrieve information from the tag rules database 1310 and/or a text mining result database that is output to the various external risk applications 1360.

According to some embodiments, the text mining platform 1352 may use Natural Language Processing ("NLP") to parse data streams into phrases and Named Entity Recognition ("NER") rules may identify important concepts that are used to augment other structured data elements as predictor variables in models. The NER rules may be stored in an NER rule library and may include individual indicators. For example, indicators associated with a subrogation analysis might include the following words or phrases: animal bite, attorney, carrier, contractor, landlord, lawsuit, low subrogation, motor vehicle accident, no subrogation, off premises, responsible party, self-inflicted, third-party, and/or zero paid. As other examples, indicators associated with a fraud detection analysis might include the following words or phrases: disputed injury, no evidence, pre-existing condition, prior history, recent hire, terminated, unhappy, un-witnessed injury, claimant lacks documentation, claimant not employee, claimant paid in cash, no Social Security number, employer paid un-reported bill, employer won't confirm information, hazardous material, and/or excluded business. As still other examples, indicators associated with a recovery factor analysis might include: alcohol, complications, diabetes, high blood pressure, narcotics, pre-existing condition, obesity, osteoarthritis, smoking, substance abuse, and/or elderly care. Note that embodiments could further include audio mining platforms as well as other types of mining platforms.

Figure 14:
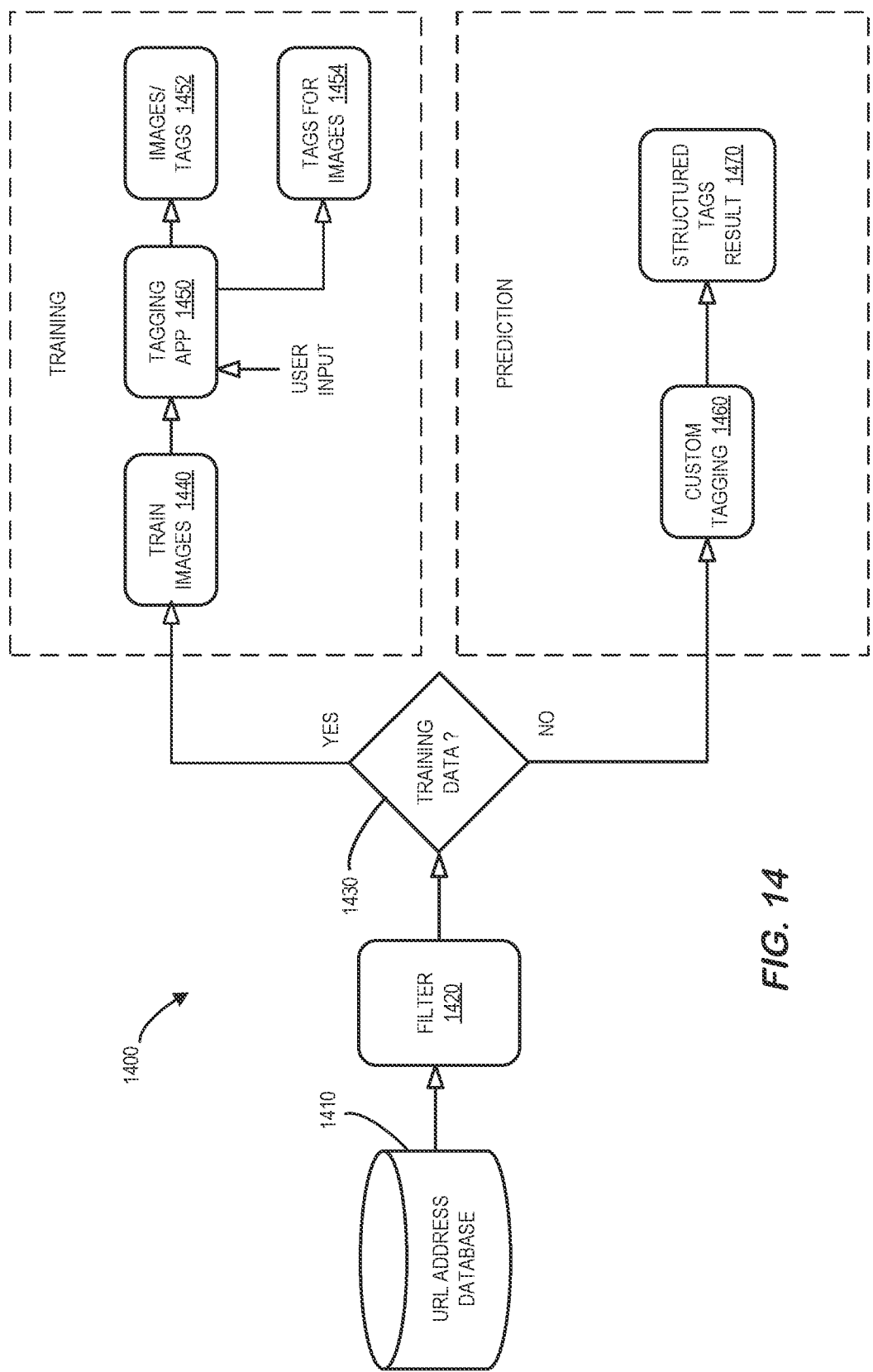
FIG. 14 is a vision process flow that might be implemented according to some embodiments.

FIG. 14 is a vision process flow 1400 that might be implemented according to some embodiments. A Uniform Resource Locator ("URL") address database 1410 may store the location of a substantial number of image files (e.g., via cloud-based storage). A filter 1420 might be applied to that set of images (e.g., in connection with general image tag learning, crowdsource tag collection, and/or a console application) and the results of the filter 1420 are separated into training data and non-training data (that is, images that are to be used for prediction) at 1430. Images determined to be training data at 1430 might be, for example, written to object storage, such as a Binary Large Object ("BLOB") storage training folder, and used by a train image process 1440. A tagging application 1450 may assign short words or identifiers ("tags") to images as appropriate (e.g., in some cases by having users tag images through a web interface) and the images and associated tags 1452 may be output (e.g., in connection with a custom image tag application or process). The set of tags for images 1454 may also be output (e.g., to be stored in a Structured Language Query ("SQL") database and/or cloud-based storage). Images determined to be non-training data at 1430 may be tagged by a custom tagging 1460 application or process, and the resulting structured tags result 1470 may be output (e.g., to be stored in an SQL database and/or cloud-based storage).

Figure 15:
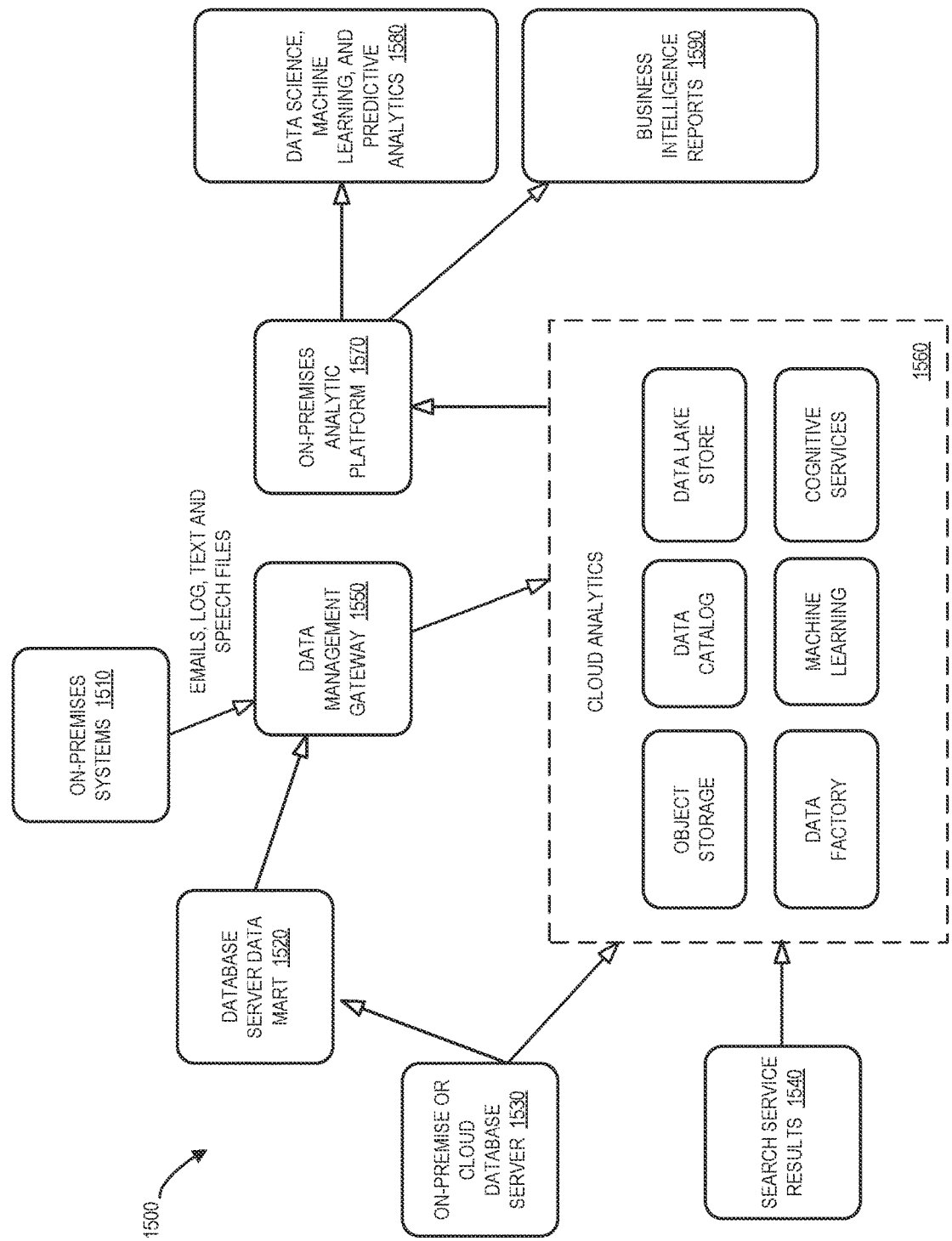
FIG. 15 illustrates an implementation of a machine learning, big data predictive analytics, and reporting platform in accordance with some embodiments.

FIG. 15 illustrates an implementation 1500 of a machine learning, big data predictive analytics, and reporting platform in accordance with some embodiments. In particular, on-premises systems 1510 (e.g., systems physically located at a business or other enterprise) may provide data to cloud analytics 1560 via a data management gateway 1550 (e.g., images associated with emails, log files, text, and speech files, tags collected via a crowdsource campaign, etc.). The cloud analytics 1560 may also receive data from an on-premise or cloud database server 1530 (either through the data management gateway 1550 and a database server data mart 1520 or directly from the database server 1530 itself). According to some embodiments, the cloud analytics 1560 may include object storage, data catalogs, data lake stores, data factories, machine learning processes, artificial intelligence or machine learning services, etc. Note that the cloud analytics 1560 might be associated with other functionality, including database databases, Java processes, chat bots, intelligent applications, in-memory storage cubes (e.g., associated with SQL Server Analysis Services ("SSAS")), business intelligence or analytics processing, predictive web services, etc. According to some embodiments, the cloud analytics 1560 might receive other types of external data, including web search service requests and/or results 1540.

The cloud analytics 1560 may generate output for an on-premises analytic platform 1570. Note that the on-premises analytic platform 1570 might also receive other information, including third-party data (e.g., from a weather service). The on-premises analytic platform 1570 may then process the received information and transmit results to data science, machine learning, and predictive analytics 1580 and/or business intelligence reports 1590 (e.g., hosted by an SQL Server Reporting Service ("SSRS")).

The embodiments described herein may be implemented using any number of different hardware configurations. For example, FIG. 16 illustrates a document tagging platform 1600 that may be, for example, associated with the system 100 of FIG. 1 as well as the other systems described herein.

Figure 16:
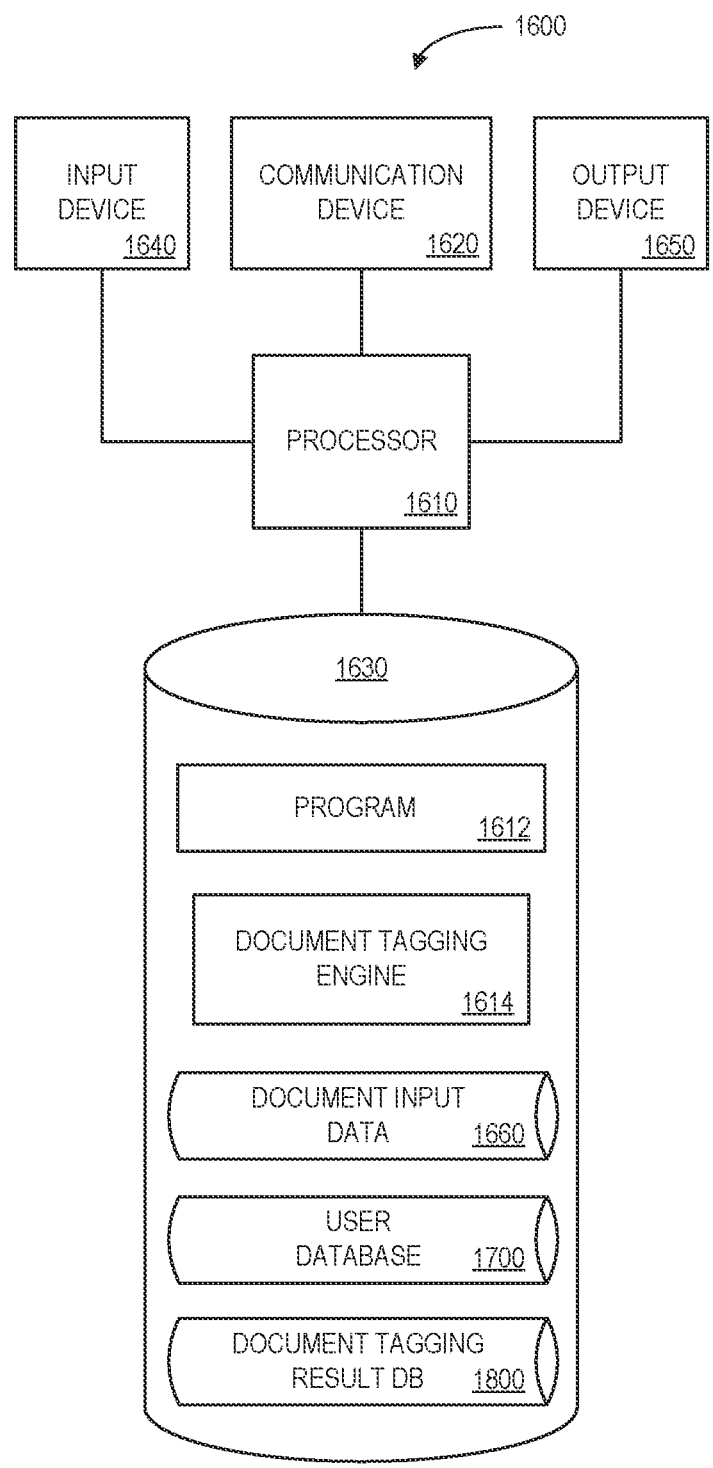
FIG. 16 is block diagram of a document tagging platform according to some embodiments of the present invention.

The document tagging platform 1600 comprises a processor 1610, such as one or more commercially available Central Processing Units ("CPUs") in the form of one-chip microprocessors, coupled to a communication device 1620 configured to communicate via a communication network (not shown in FIG. 16). The communication device 1620 may be used to communicate, for example, with one or more image sources and/or risk applications. The document tagging apparatus 1600 further includes an input device 1640 (e.g., a mouse and/or keyboard to define document rules and tags) and an output device 1650 (e.g., a computer monitor to display reports and document tagging result to an administrator).

The processor 1610 also communicates with a storage device 1630. The storage device 1630 may comprise any appropriate information storage device, including combinations of magnetic storage devices (e.g., a hard disk drive), optical storage devices, mobile telephones, and/or semiconductor memory devices. The storage device 1630 stores a program 1612 and/or document tagging engine 1614 (e.g., associated with document tagging engine plug-in) for controlling the processor 1610. The processor 1610 performs instructions of the programs 1612, 1614, and thereby operates in accordance with any of the embodiments described herein. For example, the processor 1610 may receive an input document, via the communication device 1620, and associates it with a tag request. The tagging platform automatically selects at least one electronic record associated with a first user from a user database 1700 containing electronic records associated with users (each record including at least a user identifier and a user communication address). The input document and tag request are transmitted by the processor 1610 to the communication address associated with the first user, and a document tag is received from the first user. The processor 1610 may then store the document tag in a document mining result database 1800 by adding an entry to the database identifying the received document tag and transmit an indication associated with the document mining result database 1800 to a plurality of risk applications.

The programs 1612, 1614 may be stored in a compressed, uncompiled and/or encrypted format. The programs 1612, 1614 may furthermore include other program elements, such as an operating system, a database management system, and/or device drivers used by the processor 1610 to interface with peripheral devices.

As used herein, information may be "received" by or "transmitted" to, for example: (i) the document tagging apparatus 1600 from another device; or (ii) a software application or module within the document tagging apparatus 1600 from another software application, module, or any other source.

In some embodiments (such as shown in FIG. 16), the storage device 1630 further stores document input data 1660, the user database 1700, and the document tagging result database 1800. Examples of databases that may be used in connection with the document tagging apparatus 1600 will now be described in detail with respect to FIGS. 17 and 18. Note that the databases described herein are only examples, and additional and/or different information may be stored therein. Moreover, various databases might be split or combined in accordance with any of the embodiments described herein.

Figure 17:
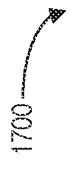
FIG. 17 illustrates a tabular portion of a rules database in accordance with some embodiments.

Referring to FIG. 17, a table is shown that represents the user database 1700 that may be stored at the document tagging apparatus 1600 according to some embodiments. The table may include, for example, entries identifying users who may facilitate crowdsource document tagging. The table may also define fields 1702, 1704, 1706 for each of the entries. The fields 1702, 1704, 1706 may, according to some embodiments, specify: a user identifier 1702, a communication address 1704, and one or more document tags 1706 for each user. The user database 1700 may be created and updated, for example, based on information received from an operator or administrator (e.g., when new employees are added to the system).

The user identifier 1702 may be, for example, a unique alphanumeric code identifying person who may help supply document tags. The communication address might indicate how that person should be contacted and the one or more document tags 1706 may represent descriptions that have been supplied by that user. For example, the presence of "STAIRS" and "ICE" in images associated with a claim file might have been flagged by the user. According to some embodiments, the user database 1700 may store a user quality score, multiple versions of a single user (e.g., a user might be an expert in some areas but not other areas), etc.

Referring to FIG. 18, a table is shown that represents the document tagging result database 1800 that may be stored at the document tagging apparatus 1600 according to some embodiments. The table may include, for example, entries identifying results of the document tagging operation. The table may also define fields 1802, 1804, 1806, 1808, 1810 for each of the entries. The fields 1802, 1804, 1806, 1808, 1810 may, according to some embodiments, specify: a document tagging result identifier 1802, a loss description 1804, a date 1806, a user identifier 1808, and a claim identifier 1810. The document tagging result database 1800 may be created and updated, for example, based on an analysis of image input data received from multiple sources and/or crowdsource image tagging. Note that image mining operations and analysis might be performed on historical image input data in addition to, or instead of, current image input data.

The document tagging result identifier 1802 may be, for example, a unique alphanumeric code identifying a result of a document tagging process (and might include the tags themselves or a link/point to where those tags are located). The loss description 1804 might categorize a cause associated with a tag and the date 1806 might indicate when the loss occurred. The user identifier 1808 might indicate which person resulted in the entry being created and may be based on, or associated with, the user identifier 1702 stored in the user database 1700. The claim identifier 1810 might indicate a claim file associated with the tag and/or an associated insurance policy. Note that other identifiers may be stored in the document tagging result database in addition to, or instead of, the claim identifier 1810. Examples of such other identifiers include a party identifier, a policy identifier, an entity identifier, a tax identifier, a physician identifier, a latitude and longitude, a postal address, etc.

Figure 19:
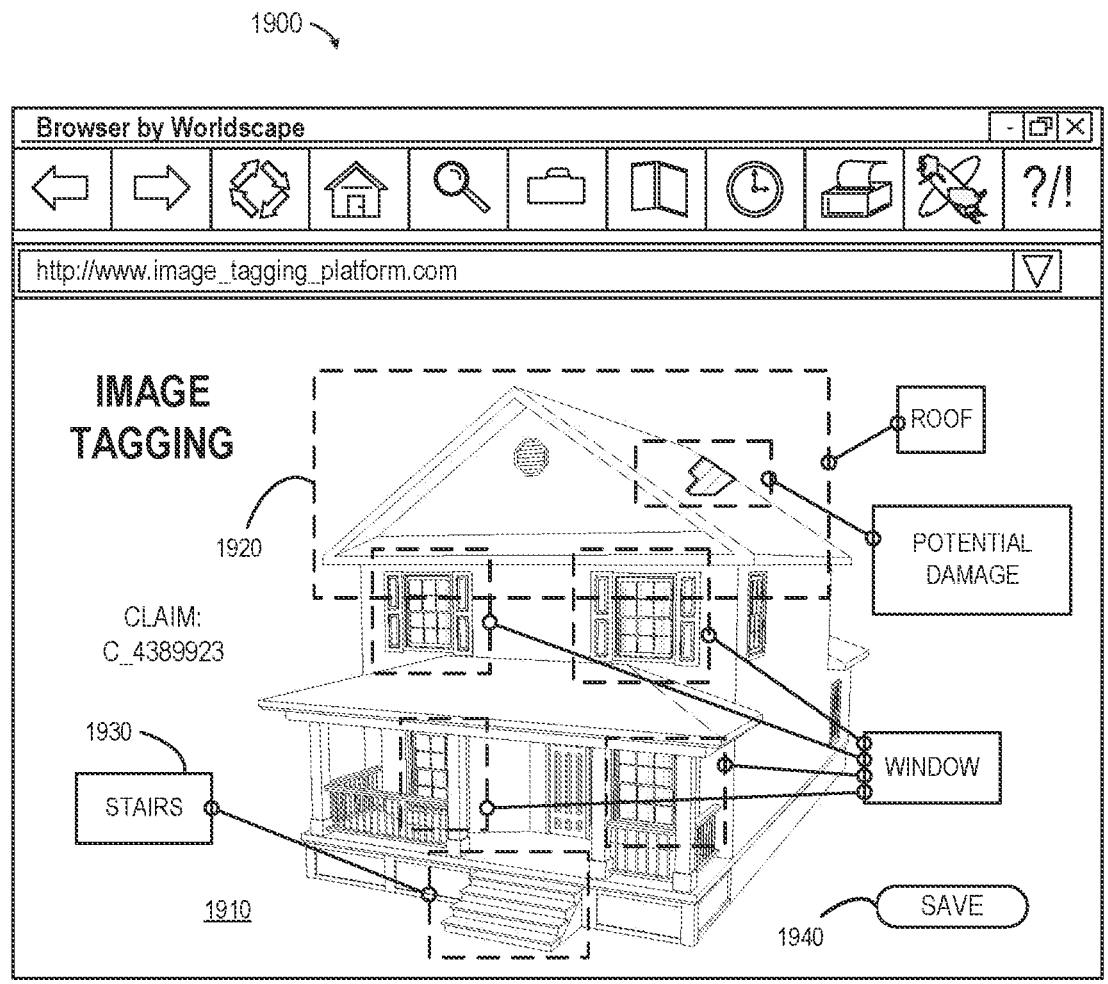
FIG. 19 illustrates an image tagging graphical user interface in accordance with some embodiments of the present invention.

An administrator interface may display various graphical user interfaces to an administrator. For example, FIG. 19 illustrates an image tagging graphical user interface 1900 in accordance with some embodiments of the present invention. The image tagging interface 1900 may include an image 1910 (e.g., of a house as illustrated in FIG. 19). A user may evaluate the image 1910 and determine a set of tags 1930 (e.g., roof, potential damage, window, stairs, etc.) that might be associated with the image 1910. Each tag 1930 might be displayed, for example, along with an indication of an image portion 1920 (as illustrated by the dashed rectangles in FIG. 19) that resulted in that tag 1930 being selected. According to some embodiments, a user or administrator may then adjust tags, add new tags, and/or save the set of image tags via selection of an icon 1940. As illustrated in FIG. 19, the image tagging display 1900 might be associated with a particular claim identifier 1810 (e.g., "C_4389923"), user identifier 1702, loss description 1804 (e.g., "hurricane"), etc.

Figure 20:
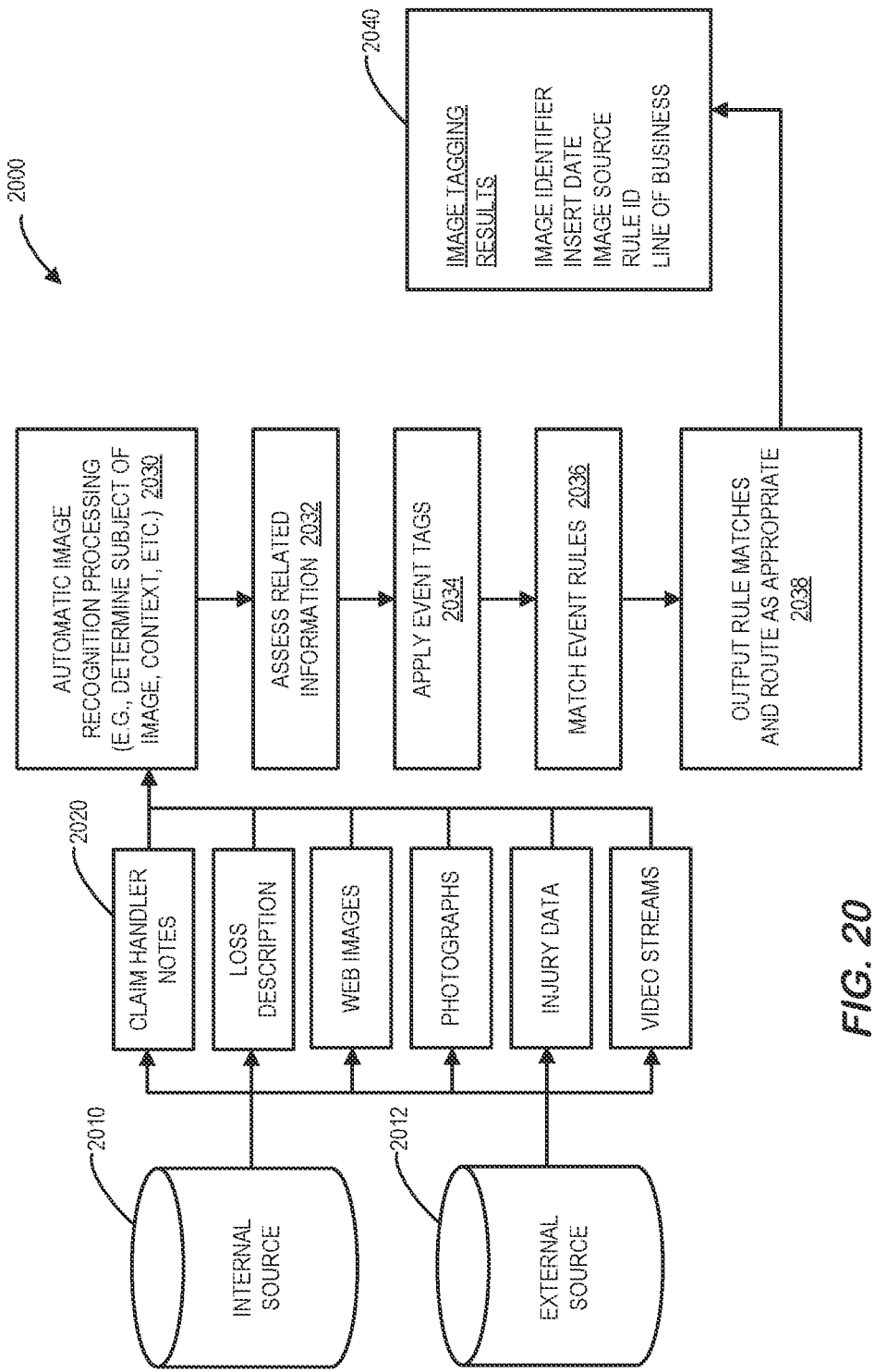
FIG. 20 illustrates a data flow according to some embodiments of the present invention.

FIG. 20 illustrates a data flow 2000 according to some embodiments of the present invention. Initially, image data may be pulled from one or more internal sources 2010 and/or external sources 2012 (e.g., on a daily basis). The pulled data may be associated with, for example, various insurance applications and/or data types 2020, such as claim handler notes, images associated with loss descriptions, injury photographs, web pictures, images associated with FNOL statements, video chat streams, etc. Note that other types of image information (e.g., weather maps or satellite photographs) might also be processed.

The pulled data may then be processed in accordance with any of the embodiments described herein (e.g., in connection with crowdsource tagging). In particular, images might be automatically processed at 2030 to determine the subject or content associated with the image (e.g., a particular image might be associated with an insurance claim). Related information may be assessed at 2032, image tags may be applied at 2034, and tag rules might be matched at 2036 with user-submitted tags (e.g., to determine that an image is associated with a building, an automobile, etc.). As a result of such processing, rule matches may be outputted and routed to an email server, workflow application, calendar application, etc. at 2038. For example, entries or records may be inserted into an image tagging result database 2040 (e.g., including fields such as an image identifier, date of insertion, an image source, etc.) for later use to train an AI model. Note that a single input file or record might result in multiple results being inserted into the image tagging result database 2040.

According to some embodiments, such a data flow 2000 may allow for the use of common domain image dictionaries (e.g., including building types, weather map patterns, facial recognition, etc.). Moreover, a composite image recognition rules library may provide for daily processing of image fields and rule changes may be tracked over time for analysis in addition to the crowdsource campaigns described herein. In addition, performance monitoring might be performed in connection with indicator incidence rate trending and new rules can be introduced with minimal code changes. According to some embodiments, a batch process may create a history for new and/or changed rules associated with the data flow 2000.

According to some embodiments, the image mining associated with the data flow is a "big data" activity that may use machine learning to sift through large amounts of unstructured data to find meaningful patterns to support business decisions. As used herein, the phrase "big data" may refer to massive amounts of data that are collected over time that may be difficult to analyze and handle using common database management tools. This type of big data may include web data, business transactions, email messages, activity logs, and/or machine-generated data. In addition, data from sensors, unstructured image posted on the Internet, such as blogs and social media, may be included in embodiments described herein.

According to some embodiments, the image mining and document tagging performed herein may be associated with hypothesis testing. For example, one or more theories may be provided (e.g., "the presence of snow on an outside staircase doubles the severity of an injury"). Knowledge engineering may then translate common smart tags for industry and scenario specific business context analysis.

In some embodiments, the image mining described herein may be associated with insight discovery wherein unsupervised data mining techniques may be used to discover common patterns in data. For example, highly recurrent themes may be classified, and other concepts may then be highlighted based on a sense of adjacency to these recurrent themes. In some cases, cluster analysis and drilldown tools may be used to explore the business context of such themes. For example, sentiment analysis may be used along with crowdsource tagging campaigns to determine how an entity is currently perceived and/or to detect that a particular automobile model is frequently experiencing a specific unintended problem.

Figure 21:
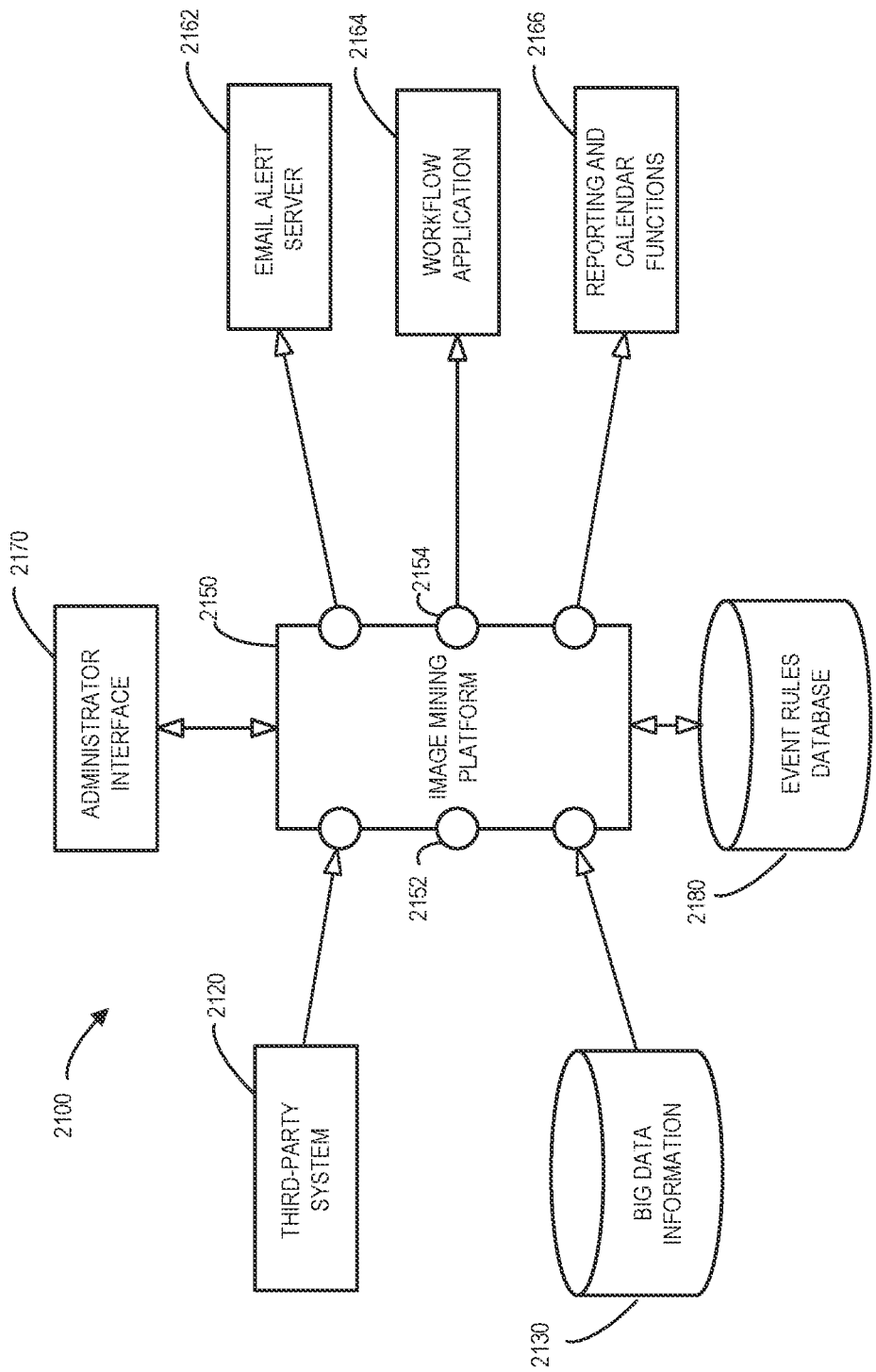
FIG. 21 is block diagram of a system according to some embodiments of the present invention.

FIG. 21 is block diagram of a system 2100 according to some embodiments of the present invention. As with the system of 1250 of FIG. 12, the system 2100 includes an image mining platform 2150 that receives information from sources, including an event rules database 2180, a third-party system 2120 (e.g., a hospital), and/or big data information 2130 (e.g., after a crowdsource tagging campaign). The image mining platform 2150 might be, for example, associated with a PC, enterprise server, a server farm, etc.

According to some embodiments, an automated image mining platform 2150 may access rules in the event rules database 2180 to mine the received images. The image mining platform 2150 may then transmit results to external systems, such as an email alert server 2162, a workflow application 2164, and/or reporting and calendar functions 2166 (e.g., executing on a server). According to some embodiments, a graphical administrator interface 2170 may provide an ability to access and/or modify the event rules database 2180 and/or a crowdsource image tagging campaign. The administrator interface 2170 might, for example, let an administrator define image dictionaries, mapping rules, etc. associated with image mining and tagging.

The image mining platform 2150 may include a number of input nodes 2152 and/or output nodes 2154, such as nodes 2152, 2154 associated with protocols and/or Application Programming Interface ("API") connections. Information provided via the output nodes 2154 may, for example, be used to augment structured data as independent variables in predictive models (e.g., a fraud detection process might look for a set of red flags, a large loss/volatile claims process might look for comorbidity, biological, psychological, and/or social conditions, and a premium evasion process might look for understatement of workforce given an image of a building and misclassified business flags).

The information provided via the output nodes 2154 may also, for example, act as an tag detector to drive alerts to a business, to identify risk claims that merit re-scoring, to alert a business to a change in claim state for escalation or re-assignment, and/or to transmit alarms indicating the presence of a foreign manufacturer on a general liability claim. According to some embodiments, mined and/or tagged indicators from claims may be used to sample and/or compare risk policies (e.g., to compare policies based on the incidence rate of a particular type of roof damage on buildings).

Figure 22:
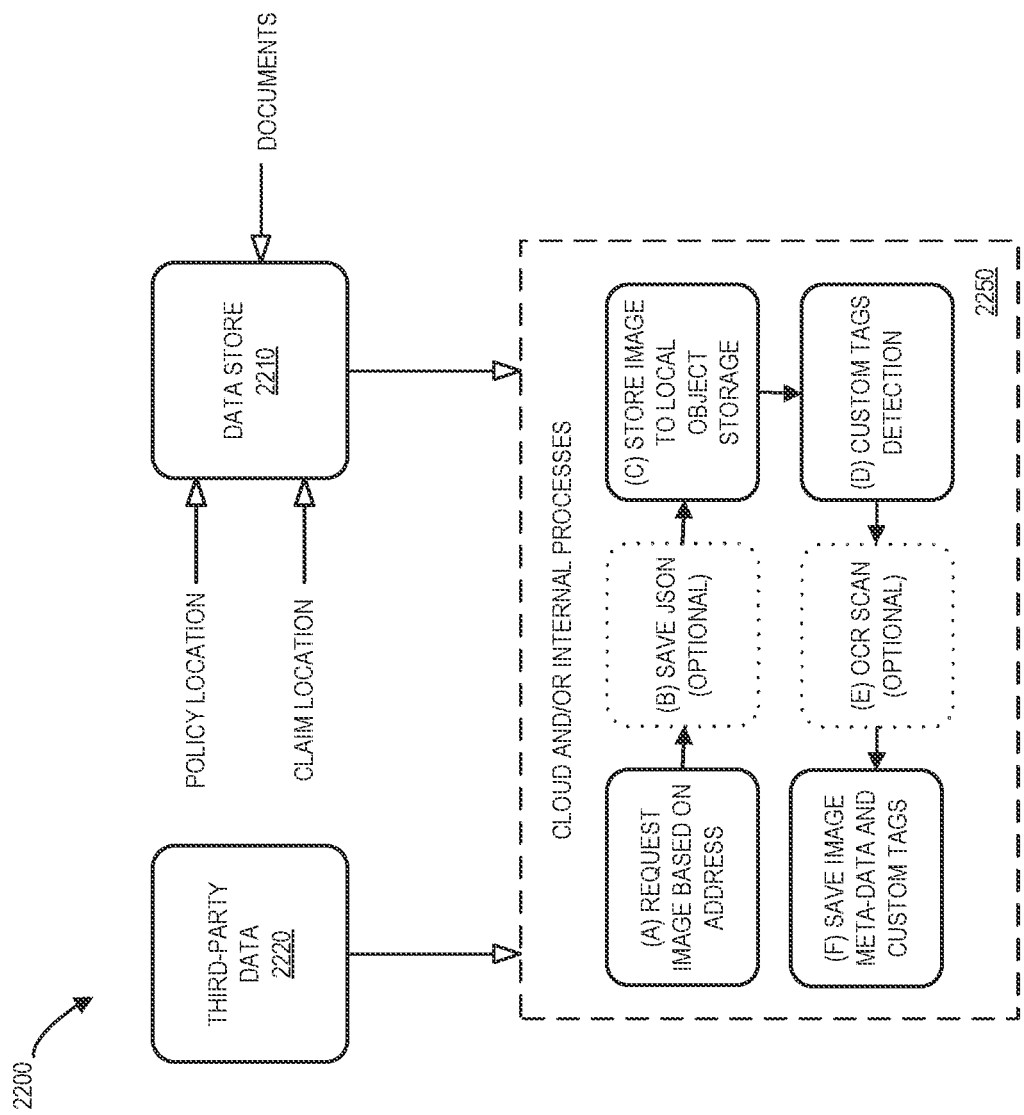
FIG. 22 is an image factory vision architecture in accordance with some embodiments.

FIG. 22 is an image factory vision architecture 2200 in accordance with some embodiments. Cloud and/or internal processes 2250 may receive image information from a data store 2210 (e.g., images from documents, an insurance policy location feed, an insurance claim location, etc.) along with third party data 2220 and data from crowdsource tagging campaigns. At (A), the system may request an image based on an address (e.g., via the Geospatial Intelligence Center ("GIC") or similar service). Optionally, at (B) the system may save JavaScript Object Notation ("JSON") information about the image via human-readable text to transmit data objects consisting of attribute—value pairs, array data types, etc. At (C), the system may store the image and/or related information to object storage, and custom tags may be detected (e.g., via artificial intelligence or machine learning services) at (D). Optionally at (E), the system may perform Optical Character Recognition ("OCR") on the image to determine words or phrases located within the picture. At (F), the system may save the image meta-data and custom tags into an image factory data mart (e.g., in an SQL format). Any of the document tags described herein, including custom tags, might be associated with generic objects or be related to a condition attribute, an occupancy attribute, a prevention attribute, an exposure attribute, etc.

Figure 23:
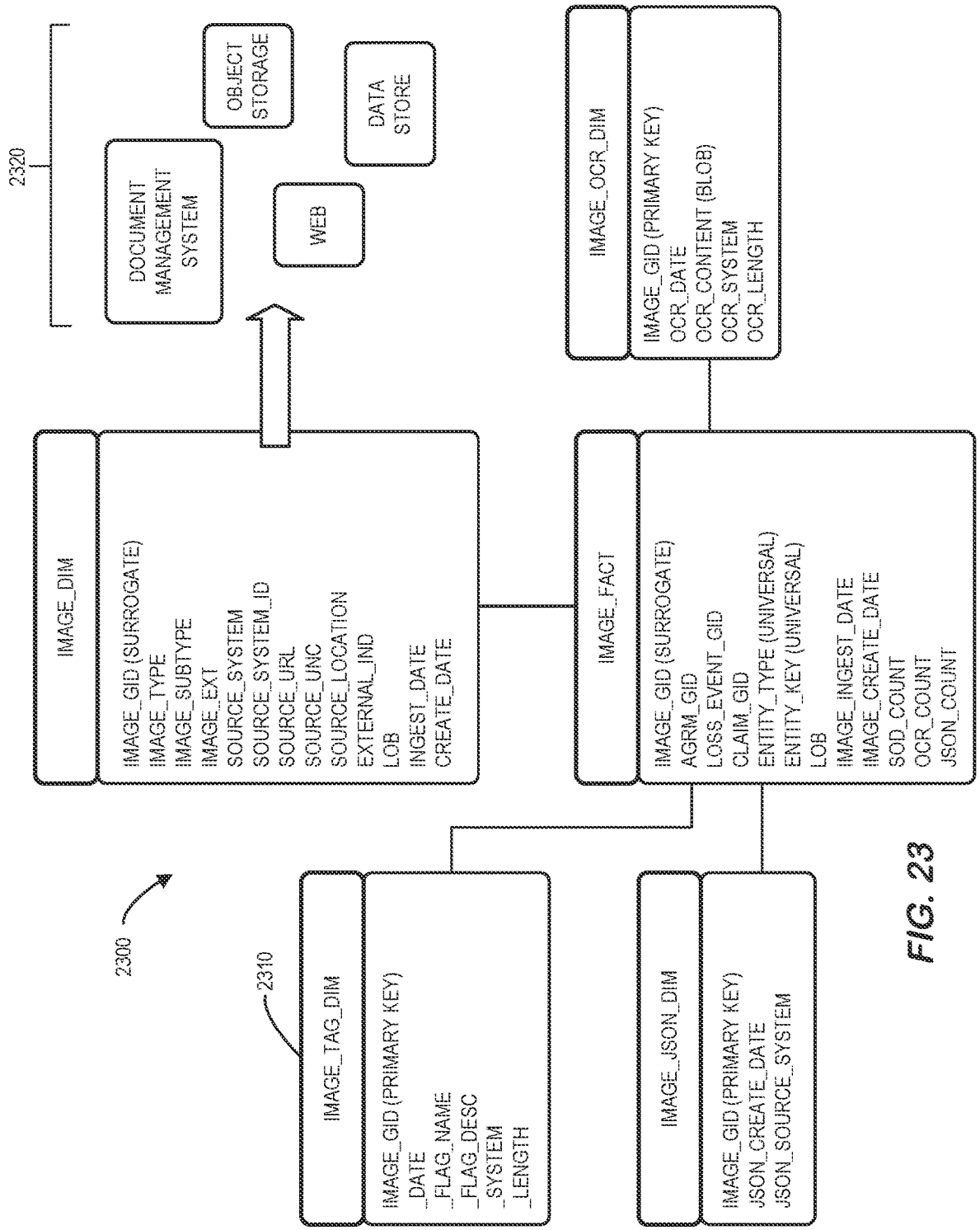
FIG. 23 illustrates an image factory vision dimensional data mart according to some embodiments.

FIG. 23 illustrates an image factory vision dimensional data mart 2300 that includes a number of elements 2310 according to some embodiments. For example, an image fact element might include data associated with an image element, an image tag element, an image JSON element, an image OCR element, etc. Examples of data that might be contained in these elements include an image identifier, an image primary key, an image type, an image source location, an ingest date, a creation date, a loss tag identifier, a claim identifier, a policy identifier, a business name, a business address, a process identifier, one or more custom image tags (e.g., associated with custom image learning), a line of business, a training indicator, etc. Information from the image element may then be transmitted to, for example, a destination 2320 such as a document management system, a web location, object storage, a data store, etc.

Figure 24:
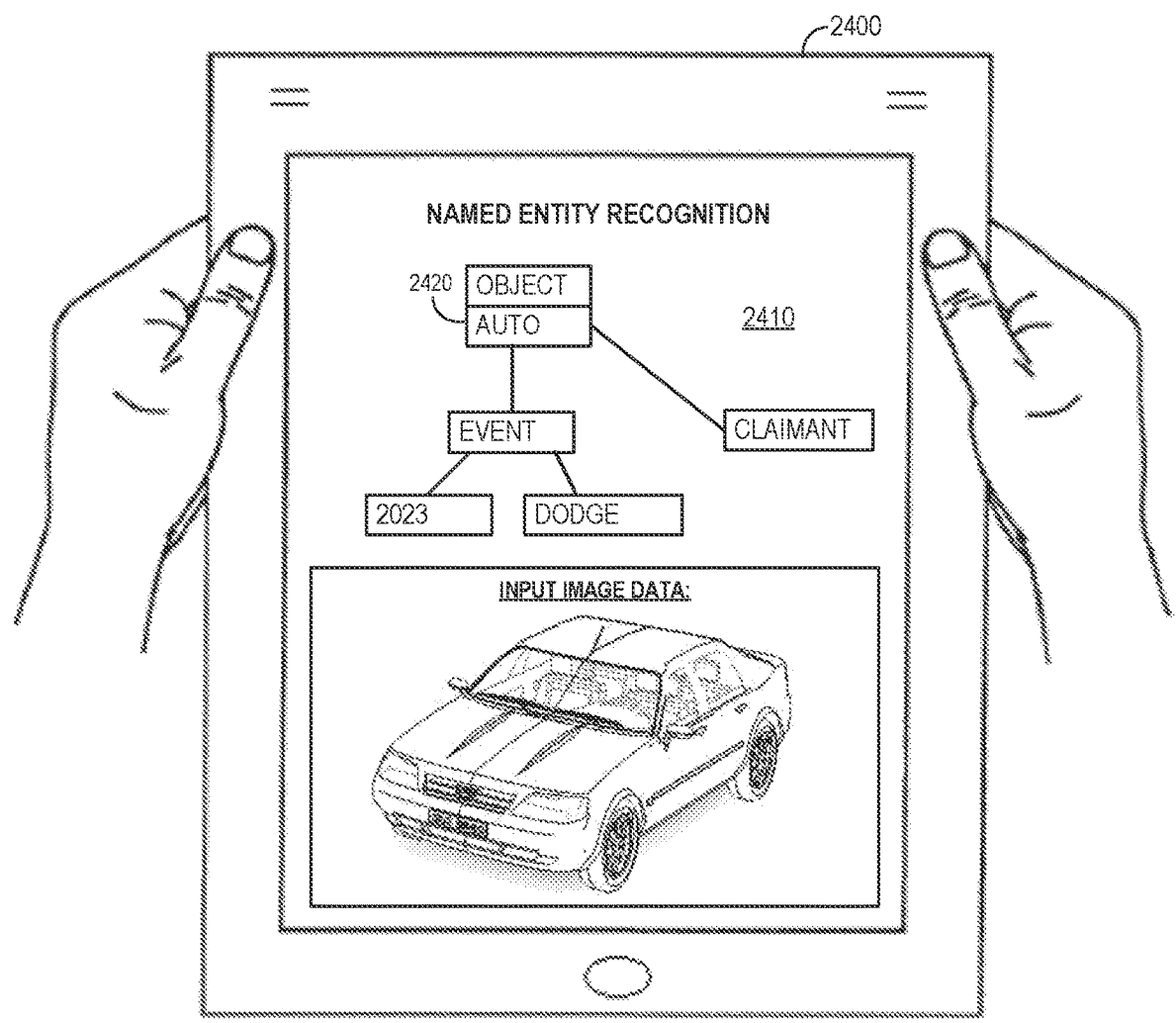
FIG. 24 illustrates a wireless or tabular device in accordance with some embodiments of the present invention.

FIG. 24 illustrates a wireless or tabular device 2400 displaying results 2410 of a named entity recognition process in accordance with some embodiments of the present invention. For example, in some embodiments, the device 2400 is an iPhone® from Apple, Inc., a BlackBerry® from RIM, a mobile phone using the Google Android® operating system, a portable or tablet computer (such as the iPad® from Apple, Inc.), a mobile device operating the Android® operating system or other portable computing device having an ability to communicate wirelessly with a remote entity.

The device 2400 presents a display 2410 that may be used to graphically tie together various crowdsource tags 2420 in association with an image (e.g., of an automobile as illustrated in FIG. 24). For example, the crowdsource tags 2420 might indicate an object type and associated details associated with that particular object (e.g., an object owner, an automobile type, a year of manufacture, etc.). In this way, the display 2410 can be used to review an automatically determined structure or hierarchy of data, adjust elements as appropriate, etc. (e.g., via a touchscreen interface of the device 2400).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

Figure 25:
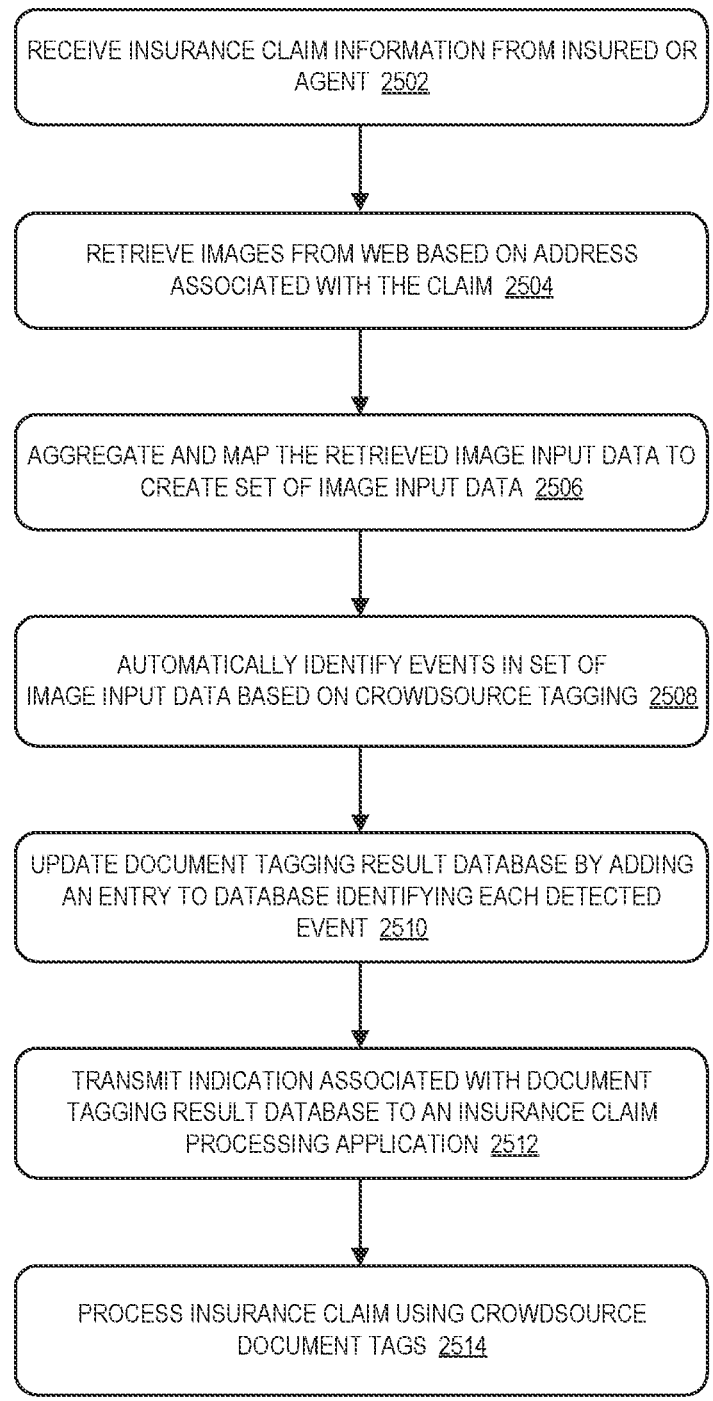
FIG. 25 is a business process flow that might be associated with one or more risk applications.

Applicants have discovered that embodiments described herein may be particularly useful in connection with insurance policies and associated claims. For example, FIG. 25 illustrates an insurance business process flow in accordance with some embodiments. At 2502, an insurer may receive insurance claim information from an insured or an insurance agent. At 2504, images may be retrieved from the web based on an address associated with the claim. At 2506, the system may aggregate and map the retrieved image input data to create a set of image input data (e.g., by combining images, removing duplicate images, etc.). At 2508, the system may automatically identify tags (e.g., objects or item) in the set of image input data based on crowdsource tagging. The system may update a document tagging result database at 2510 to identify each document tag. At 2512, the system may transmit an indication associated with the document tagging result database to an insurance claim processing application (e.g., using the data to automatically pre-populate a portion of an insurance claim form to reduce errors). At 2514, the system may process the insurance claim using the crowdsource document tags. Note that other types of business and risk data may also benefit from the present invention. For example, embodiments might be used in connection with bank loan applications, warranty services, etc.

Thus, embodiments may help enable golden record set creation and custom deep learning model training using a custom web hosted application that allows crowdsourcing of labeling tasks to employees (those who choose to volunteer or opt-in). This may enable scalable visual attribute (tag) identification for images and other documents. For insurance underwriting use cases, image tags to be deployed might relate to coverage, occupancy, protection, and exposure factors identified and prioritized by underwriting experts. Overall, embodiments may help an underwriting practice make better decisions, reduce repetitive or redundant workflow components, and bring automation to new and renewal low risk business, and identify complex cases that might require manual review. Embodiments may also reduce onsite assessments, help monitor changes in condition over time, provide complementary insights to traditional data sources, automate work where lower risk is identified (i.e., straight-through or "no touch" processing), moderate risk under hazardous conditions (flood, fire, roofs), etc.

Moreover, although some embodiments have been described with respect to particular image mining approaches, note that any of the embodiments might instead be associated with other image processing techniques. For example, image processing may operate to mine certain characteristic information from various social networks to determine whether a party is engaging in certain risky behavior or providing high risk products. It is also contemplated that embodiments may process images including text in one or more languages, such English, French, Arabic, Spanish, Chinese, German, Japanese and the like. In an exemplary embodiment, a system can be employed for sophisticated image analyses, wherein image can be recognized irrespective of the image source. Any relationships between the various images can be clarified by using a rules engine that determines a distance, field-of-view, angle, etc. of an item within the images.

According to some embodiments, image data may be used in conjunction with one or more predictive models to take into account a large number of underwriting and/or other parameters. The predictive model(s), in various implementation, may include one or more of neural networks, Bayesian networks (such as Hidden Markov models), expert systems, decision trees, collections of decision trees, support vector machines, or other systems known in the art for addressing problems with large numbers of variables. Preferably, the predictive model(s) are trained on prior image data and outcomes known to the risk company. The specific image data and outcomes analyzed may vary depending on the desired functionality of the particular predictive model. The particular image data parameters selected for analysis in the training process may be determined by using regression analysis and/or other statistical techniques known in the art for identifying relevant variables and associated weighting factors in multivariable systems. The parameters can be selected from any of the structured data parameters stored in the present system (e.g., image tags and tag data), whether the parameters were input into the system originally in a structured format or whether they were extracted from previously unstructured image, such as from big data.

In the present invention, the selection of weighting factors (either on a tag level or an image source level) may improve the predictive power of the image mining and tagging. For example, more reliable image sources may be associated with a higher weighting factor, while newer or less reliable sources might be associated with a relatively lower weighting factor.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:
1. A document tagging system, comprising:
a communication device to receive an input document;
a user data store containing electronic records associated with users, each electronic record including at least a user identifier and a user communication address; and
a tagging platform, coupled to the communication device and the user data store, including:
a computer processor; and
a computer storage device in communication with said computer processor and storing instructions adapted to be executed by said computer processor to:
receive the input document,
associate the input document with a tag request,
automatically select at least one electronic record associated with a first user,
transmit the input document and tag request to the communication address associated with the first user,
receive a document tag from the first user, wherein the document tag is any object describing a document,
store the document tag in a document mining result database by adding an entry to the document mining result database identifying the received document tag, and
transmit an indication associated with the document mining result database to a plurality of risk applications adapted to execute phases of an insurance process, wherein the risk applications are associated with an enterprise, the users comprise employees of the enterprise, and access to a computer system by the first user is dependent on and provided after receipt of the document tag from the user.

2. The system of claim 1, wherein the tagging platform sends the input document to multiple users and aggregates multiple document tags from those users.

3. The system of claim 1, wherein receipt of the document tag results in an automatic generation of a subsequent tag request in accordance with a tag hierarchy.

4. The system of claim 1, wherein the electronic record includes a user quality attribute indicative of a predicted document tag accuracy.

5. The system of claim 1, wherein the document mining result database further store at least one of: (i) an amount of time associated with the document tag, (ii) a time of day associated with the document tag, (iii) a day of week associated with the document tag, and (iv) a time of year associated with the document tag.

6. The system of claim 1, wherein execution of the stored instructions further causes the computer processor to:
receive, from at least one of the risk applications, feedback information associated with the document tag, and based on the received feedback information, automatically update information in the user data store.

7. The system of claim 1, wherein the input document is associated with at least one of: (i) a risk claim file, (ii) a risk claim note, (iii) a medical report, (iv) a police report, (v) social network data, (vi) web image data, (vii) Internet of Things data, (viii) Global Positioning System ("GPS") satellite data, (ix) activity tracking data, (x) big data information, (xi) a loss, (xii) an injury, (xiii) an image associated with a final notice of loss statement, (xiv) video chat stream, (xv) optical character recognition data, (xvi) third-party data, and (xvii) a governmental agency.

8. The system of claim 1, wherein the transmitted indication is to: (i) trigger a risk application, or (ii) update a risk application.

9. The system of claim 1, wherein the transmitted indication is associated with a variable or weighing factor of a predictive model.

10. The system of claim 1, wherein the input document comprises at least one of: (i) an image, (ii) a word processing document, (iii) a video, and (iv) an audio file.

11. The system of claim 1, wherein the tag is associated with at least one of: (i) an item present within an image, and (ii) an activity associated with an image.

12. The system of claim 1, wherein the entry added to the document mining result database includes at least one of: (i) an image identifier, (ii) an insert date, (iii) an image source, (iv) a rule identifier, and (v) a line of business.

13. The system of claim 1, wherein the computer storage device further stores instructions adapted to be executed by said computer processor to:
identify at least a portion of the input document as being connected with one of training data and non-training data, and
associate that portion of the input document with a custom tag based on one of the training data and non-training data.

14. The system of claim 1, wherein said automatic selection is performed via cloud analytics associated with at least one of: (i) object storage, (ii) a data catalog, (iii) a data lake store, (iv) a data factory, (v) machine learning, and (vi) artificial intelligence services.

15. A computer-implemented method, comprising:
receiving an input document at a tagging platform via a communication device;
associating the input document with a tag request;
automatically selecting at least one electronic record associated with a first user from a user data store containing electronic records associated with users, each electronic record including at least a user identifier and a user communication address;
transmitting the input document and tag request to the communication address associated with the first user;
receiving a document tag from the first user, wherein the document tag is any object describing a document;
storing the document tag in a document mining result database by adding an entry to the document mining result database identifying the received document tag; and
transmitting an indication associated with the document mining result database to a plurality of risk applications adapted to execute phases of an insurance process, wherein the risk applications are associated with an enterprise, the users comprise employees of the enterprise, and access to a computer system by the first user is dependent on and provided after receipt of the document tag from the first user.

16. The method of claim 15, wherein the tagging platform sends the input document to multiple users and aggregates multiple document tags from those users.

17. The method of claim 15, wherein receipt of the document tag results in an automatic generation of a subsequent tag request in accordance with a tag hierarchy.

18. A non-transitory computer-readable medium storing instructions adapted to be executed by a computer processor to perform a method, said method comprising:
receiving an input document at a tagging platform via a communication device;
associating the input document with a tag request;
automatically selecting at least one electronic record associated with a first user from a user data store containing electronic records associated with users, each electronic record including at least a user identifier and a user communication address;
transmitting the input document and tag request to the communication address associated with the first user;
receiving a document tag from the first user, wherein the document tag is any object describing a document;
storing the document tag in a document mining result database by adding an entry to the document mining result database identifying the received document tag; and
transmitting an indication associated with the document mining result database to a plurality of risk applications adapted to execute phases of an insurance process, wherein the risk applications are associated with an enterprise, the users comprise employees of the enterprise, and access to a computer system by the first user is dependent on and provided after receipt of the document tag from the user.

19. The medium of claim 18, wherein the electronic record includes a user quality attribute indicative of a predicted document tag accuracy.

* * * * *